US009081601B2

(12) United States Patent
Tang

(10) Patent No.: US 9,081,601 B2
(45) Date of Patent: Jul. 14, 2015

(54) VIRTUAL MOBILE INFRASTRUCTURE AND ITS BASE PLATFORM

(75) Inventor: Chang Bin Tang, Shanghai (CN)

(73) Assignee: TRANSOFT (SHANGHAI) INC., Shanghai (CN)

( * ) Notice: Subject to any disclaimer, the term of this patent is extended or adjusted under 35 U.S.C. 154(b) by 1733 days.

(21) Appl. No.: 12/354,055

(22) Filed: Jan. 15, 2009

(65) Prior Publication Data
US 2010/0146504 A1    Jun. 10, 2010

(30) Foreign Application Priority Data

Dec. 10, 2008    (CN) .......................... 2008 1 0204286

(51) Int. Cl.
*G06F 9/455*    (2006.01)

(52) U.S. Cl.
CPC .................................. *G06F 9/45537* (2013.01)

(58) Field of Classification Search
None
See application file for complete search history.

(56) References Cited

U.S. PATENT DOCUMENTS

| | | | |
|---|---|---|---|
| 7,865,893 B1 * | 1/2011 | Omelyanchuk et al. .......... 718/1 |
| 2006/0146057 A1 * | 7/2006 | Blythe ........................ 345/506 |
| 2007/0006226 A1 * | 1/2007 | Hendel .............................. 718/1 |
| 2007/0089111 A1 * | 4/2007 | Robinson et al. ................. 718/1 |
| 2008/0183641 A1 | 7/2008 | Tang et al. |
| 2008/0320295 A1 * | 12/2008 | Chong et al. ....................... 713/2 |
| 2009/0036111 A1 * | 2/2009 | Danford et al. ............... 455/419 |
| 2009/0119087 A1 * | 5/2009 | Ang et al. ........................ 703/23 |
| 2009/0157882 A1 * | 6/2009 | Kashyap ....................... 709/227 |
| 2009/0290501 A1 * | 11/2009 | Levy et al. ..................... 370/250 |
| 2009/0305790 A1 * | 12/2009 | Lu et al. .......................... 463/42 |
| 2009/0320010 A1 * | 12/2009 | Chow et al. ................... 717/154 |
| 2009/0325562 A1 * | 12/2009 | Hough et al. ................. 455/418 |
| 2010/0138744 A1 * | 6/2010 | Kamay et al. ................. 715/716 |

FOREIGN PATENT DOCUMENTS

CN    101231731    7/2008

* cited by examiner

*Primary Examiner* — Jacob A Petranek
(74) *Attorney, Agent, or Firm* — Hamre, Schumann, Mueller & Larson, P.C.

(57) ABSTRACT

A virtual mobile infrastructure (VMI) includes a base platform that has a plurality of hosts. On a host operation system (OS), a quick emulator (QEMU) process is used to virtualize at least one guest cell phone operating system. A data center manages these cell phone OSes generated by this base platform, allocates the OSes to users, and allows communication between cell phone client and server via mobile terminal protocol. A virtual machine (VM) switch contains a method to use the VMI, and to acquire adapted cell phone screen and inexpensive cell phone VM. A VMI product is able to encapsulate the third-party virtual desktop infrastructure (VDI) products (such as Citrix XenDesktop, LeoStream, etc.), henceforth to acquire screens from PC VM as well. Moreover, a VM manager allows administrators of enterprises to manage thousands of VMs.

21 Claims, 31 Drawing Sheets

VIRTUAL MOBILE INFRASTRUCTURE AND ITS BASE PLATFORM

CROSS-REFERENCE TO RELATED APPLICATIONS

This application claims priority to Chinese Application No. 200810204286.X, filed on Dec. 10, 2008, the entire contents of which is incorporated herein by reference.

FIELD OF THE INVENTION

The invention involves a virtual mobile infrastructure. The infrastructure involves how the cell phone user obtains a (PC and cell) virtual mobile (VM) in the data center and the screen of applications running on the VM, specifically how cell phone VM is generated via the QEMU of the data-center server, and how the VM pool is used to manage large amount of VMs.

BACKGROUND OF THE INVENTION

With the advance of computer and internet technology, there appears a trend for the virtualization of personal computer (PC) OS. The PC OS no longer runs on the local real machine, instead is centrally managed in a remote data center where large amount of OSes are virtualized. Meanwhile, the desktop of the OS is delivered to the terminals via network. As an applied area of PC OS virtualization, this is called Virtual Desktop Infrastructure, or briefly VDI.

The VDI management software controls a large number of PC VMs in pooling in the data center, while a connection broker sends out RDP screen to desktop thin clients. The technology from VMWare ESXi, Citrix Xen, and Microsoft Hyper-V serves as the VDI foundation.

On the other hand, today's high-end Smartphone is starting to become similar to a personal computer. For example, a mobile handheld device such as the Blackberry or iPhone in today's market can go online, check e-mail, play music, stream videos, take pictures, navigate driving, or simply make a phone call. The demand of cell phone capabilities keeps on increasing. This leads to a high cost of cell phone manufacturing. Therefore, recently the concept of virtual mobile is proposed, namely the virtualization of large number of cell phone OSes with the resources and fix net of the data center, and the delivery of screen to cell phone terminal.

Compared to the traditional cell phone technology, virtual mobile has the advantages (1) a quick expansion of IT automation to anyone who carries a cell phone, with lots of old PC applications and new mobile applications executed on the VMs in the data center and screen-transmitted to cell phones. (2) Enabling virtualization will also allow the mobile devices to be more secure against virus attacks or lose of the physical device. (3) The screen of Mobile VM is much more adapted to the cell phone as a client, plus it requires much less transfer data, hence lower wireless bandwidth. (4) The cell phone client is able to take advantage of huge inexpensive resources of CPU, memory, disk, and fix net in the data center.

Under this virtual mobile background, a viable, highly effective Virtual Mobile Infrastructure (VMI) becomes an urgently-needed solution to the domain problem.

SUMMARY OF THE INVENTION

The purpose of this invention is to provide a virtual mobile infrastructure. Specifically, it involves the infrastructure for the enterprises or mobile service providers to deliver PC and/or cell phone screen to the cell phone.

With the features of a VM switch, a method utilizes this invention's VMI to obtain an adapted cell phone screen and an inexpensive VM. In one embodiment, the system can encapsulate the third-party VDI products (e.g. Citrix XenDesktop, LeoStream, etc.), henceforth to obtain the screen of a PC VM. Additionally, through the VM management method, the administrators of the enterprises or mobile service providers are able to manage thousands of VMs.

To fulfill the above goal, this invention uses a virtual mobile infrastructure, including:

a base platform, including several hosts, each running a QEMU process to virtualize at least one guest operating system and its memory as a cell phone VM;

a data management center, to manage the cell phone VMs generated by the said base platform and to allocate the said cell phone VM to the user;

a VM switch, to connect the said base platform and the said data management center. The said VM switch allows the user select cell phone OS and cell phone application that runs on the cell phone VM, according to the user requests from cell phone client; and a server, based on the mobile terminal protocol, to interact with the cell phone client.

In one embodiment of this invention, the base platform further includes: a method for the QEMU process and kernel of the guest operating system to share host memory.

In one embodiment of this invention, the base platform further includes: a performance agent to acquire the performance statistics of the host and/or its child processes.

In one embodiment of this invention, the base platform further includes: a method to improve QEMU's soft MMU, where the system uses a page lookup to find the physical address of the virtual address of the guest OS memory region, and further takes this physical address as an offset to mask out the address in an assembly instruction.

In one embodiment of this invention, the base platform further includes: A preprocessor to debug virtualized I/O device drivers, based on the openness of the source code of guest OS and its platform building tool. For complete openness, a re-build of source code can run directly on x86 platform; if the platform building tool is acquired, then I/O driver can be debugged with the tool; otherwise, the development hardware board and BSP must be used to help the reverse engineering work.

In one embodiment of this invention, the said MTP-based server runs on top of the host operating system of the said base platform.

In one embodiment of this invention, the said MTP-based server further includes:

A method to adapt the screen proportionally to the cell phone screen size by shrinking, expanding, rotating, and compressing the screen image before it is sent to the client;

A method to detect image change, recognize text, and deliver text and changed square region only, before the image is sent to the client.

In one embodiment of this invention, the said cell phone client includes: A method to deliver GPS longitude and latitude data through data channel to the said MTP server, support echo canceling, and negotiate the optimal method from multiple audio codecs, based on the wireless bandwidth and cell phone hardware capability.

In one embodiment of this invention, the said data management center further includes:

A VM allocator, to build session, acquire optimal VM from a VM pool, and allocate VM to cell phone clients;

A VM pool manager, to select optimal VM in the pool, return VM to the pool, check VM state, and use a background worker to continuously check pool status in order to match the rules from a rule engine;

A VM server manager, to manage multiple hosts and use platform API to interact with the said base platform; and A management console, to unify the management of the composition of the following resources: human organization, template, virtual machine, application, package, and platform server.

In one embodiment of this invention, the said rule engine includes the control rules of VM generation, destroy, start and stop. The said rules can be created, edited, loaded, saved, and deleted by administrators with high-level computer language.

In one embodiment of this invention, the said VM switch includes: connection broker, to provide access for cell phone client, and deliver OS screen and application screen to the client.

In one embodiment of this invention, the client access through the said connection broker, further includes: unified authentication and authorization to complete the Kerberos security protocol and single sign-on (SSO).

In one embodiment of this invention, the said VM switch includes: personnel and organization databases, application and package databases, as well as VM server and template management databases.

In one embodiment of this invention, it further includes a method to manage template. The template is used to bind one or more of the following configuration items: VM, memory, CPU, application, host, and cell phone OS.

In one embodiment of this invention, it further includes a VDI socket, where the said VM switch can encapsulate a third-party VDI product via VDI socket, so that a user is able to select PC VM and PC application running on an external VDI product.

In one embodiment of this invention, the said VDI socket further includes:

A PC connection broker, to inform external VDI product that after user login, which application will be run on the selected VM, and to inform cell phone client to get ready to receive application screen via MTP after PC application agent activates the said application.

A PC application agent, installed on the VM of external VDI product beforehand. When the VM starts, the application agent itself is activated, and then activates the requested PC application. The application agent then informs PC connection broker the failure or success of the activation. If successful, the application screen is delivered to the cell phone client. When cell phone client disconnects, PC application agent shuts down the application.

On the other hand, this invention proposes a virtual mobile base platform, including:

Several hosts, each including:

At least one QEMU emulator running on the host OS, to virtualize at least one guest operating system;

A method that allows the QEMU process and kernel of the guest OS share host memory;

A performance agent that acquires performance statistics of child process and/or host;

An MTP-based server, to interact with cell phone client.

In one embodiment of this invention, the aforementioned virtual mobile base platform further includes:

A method to improve QEMU soft MMU, where the system uses a page lookup to find the physical address of the virtual address of the guest OS memory region, and further takes this physical address as an offset to mask out the address in an assembly instruction.

In one embodiment of this invention, the said virtual mobile base platform further includes:

A preprocessor to debug virtualized I/O device drivers, based on the openness of the source code of guest OS and its platform building tool. For complete openness, a re-build of source code can run directly on x86 platform; if the platform building tool is acquired, then I/O driver can be debugged with the tool; otherwise, the development hardware board and BSP must be used to facilitate the reverse engineering work.

This invention provides a method to subscribe application on a mobile network for enterprises and mobile service providers. This method is based on the cell phone OS virtualization, to build a MTP client, so that user is able to access, acquire VM, run application, obtain cell application screen, and henceforth run any cell operating system and cell application. Additionally, because it can encapsulate the third-party VDI products, it can also run any PC operating system and PC application.

In this invention, a user uses Smartphone instead of dumb terminal, thereby obtain screen via remote desktop protocol (RDP) or RDP-compatible mobile terminal (MTP). The screen can come from not only (a) PC VM (the backend is the same as VDI, but with cell screen adaptor); but also (b) cell VM in the data center.

DETAILED DESCRIPTION OF THE PREFERRED EMBODIMENTS

Architecture

Figure 1A:
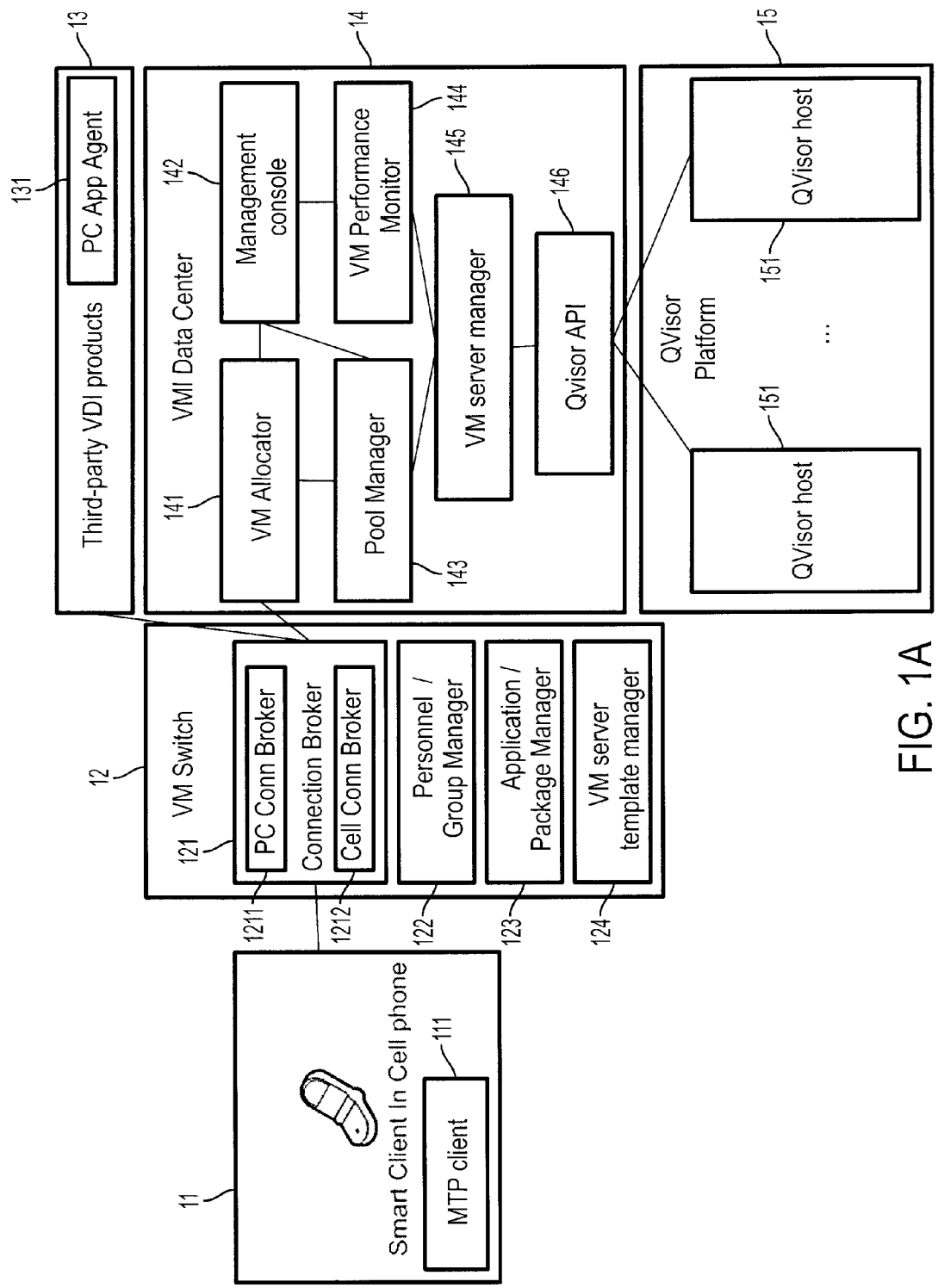
FIG. 1A is the system architecture diagram of the virtual mobile infrastructure of this invention.

FIG. 1A is the system architecture diagram of the virtual mobile infrastructure (VMI) of this invention. This VMI includes VM switch 12, optional third-party VDI product 13, data management center 14 and base platform 15 (called QVisor platform in this invention). One example of the data management center 14 is the Weining Data Center of applicant's VMI product.

In FIG. 1A, cell phone as a client 11 uses VM switch 12 to obtain cell phone screen from Transoft data management center 14. Data management center 14 interacts with QVisor platform 15 where QVisor host 151 supplies multiple cell phone VMs. In one embodiment, cell phone client 11 may also obtain PC VM screen from third-party VDI products 13.

The purpose of VM switch 12 is to deliver application screen from VDI PC VM and VMI cell VM platforms to cell phone client 11. A typical VMI configuration is like this: VM switch is installed at a geographical node, simultaneously controls multiple aforementioned data management center 12 and multiple VDI products 13. Here, VM switch 12 may allow user to select an application running on VMI (cell VM) or third-party VDI (PC VM) backend systems.

In one embodiment, VDI system may also combine with applicant's patent "A generalized application virtualization method for business use on the web, and the mini server using this method" (US patent publish No. US 2008/0183641A1 and China patent publish No. CN101231731A). The applicant's product TRANSOD's client and server may also run in the data management center, to facilitate automatic application deployment.

VM switch 12 has a connection broker 121 managing connections from VDI products or VMI data management center. Connection broker 121 consists of PC connection broker 1211 and cell connection broker 1212. The VM switch 12 also manages the database of personnel and organization 122, database of application and package 123, and database of VM server and templates 124. The operations of these databases are not detailed here. VM switch 12 decides if the user has the privilege to obtain the screen of the subscribed application. VM switch 12 also decides if the application is from the third-party VDI backend, or from the data management center QVisor backend, thus to take proper action to adapt the screen for the cell phone client.

VDI third-party product 13 employs PC application agent 131 and PC connection broker 1211 to become part of the VMI architecture. 131 and 1211 thus forms the so-called "VDI socket".

Data management center 14 is the management system of cell phone VM, including VM allocator 141, management console 142, pool manager 143, VM performance monitor 144, VM management server 145, and QVisor APIs 146. The data management center contains the current states of all VMs. It is able to acquire and allocate VMs from QVisor via the VM pool manager. The acquisition of a VM needs access to QVisor API via VM server manager. QVisor API includes: create and destroy VM, start and stop VM, get VM, list VM, list running VM, list off VM, and get VM performance.

Figure 1B:
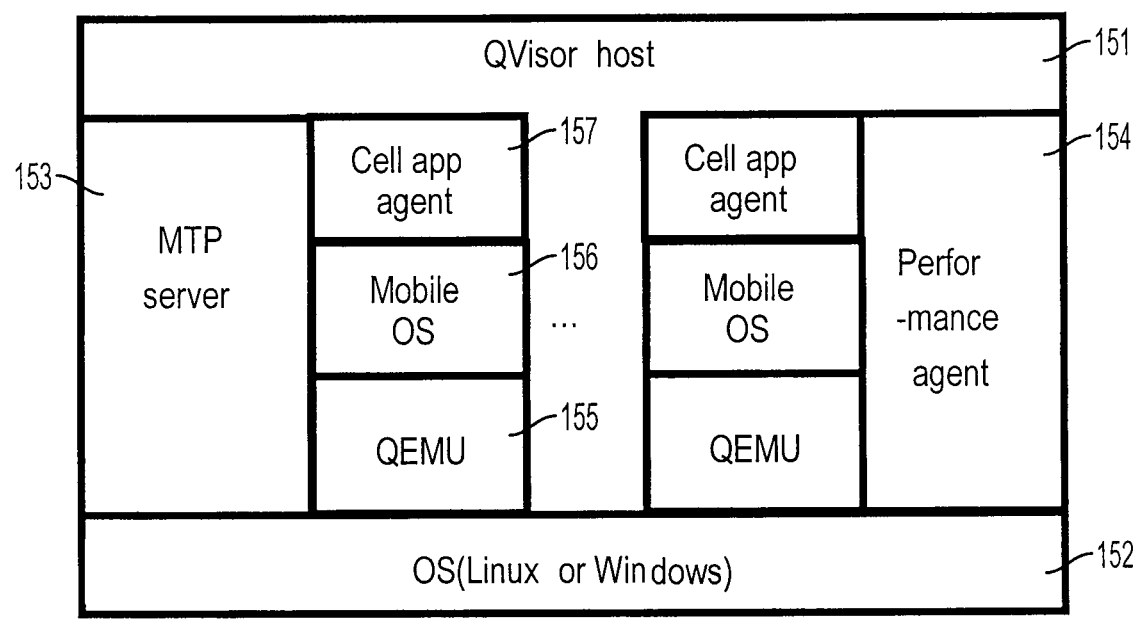
FIG. 1B is the QVisor host layering architecture diagram of the virtual mobile infrastructure of this invention.

QVisor platform 15 is the base technology of VMI. The platform contains multiple QVisor hosts 151. Each QVisor host runs host operating system 152. On top of the host OS, there are MTP server 153, performance agent 154 and multiple QEMU child processes 155. A cell phone operating system 156 runs on top of QEMU. The cell phone operating system can be Win Mobile, gPhone, iPhone, etc. As the cell phone OS boots, the cell application agent 157 automatically starts. QVisor platform 15 has a layering architecture as shown in FIG. 1B. QVisor platform executes performance monitoring, shared QEMU and kernel, memory paging optimization, and I/O device debugging preprocessor.

To realize VMI, it is necessary to have MTP client 111 talks with MTP server 152 via the MTP protocol. MTP client 11 is the software downloaded to the cell phone. MTP server 152 runs on top of Linux of the QVisor host 151. MTP protocol is detailed as follows:

Mobile Terminal Protocol (MTP) client is installed on the cell phone (no need to install if Win Mobile cell phone already comes with RDP (remote desktop protocol) 6.0 client, or iPhone already comes with Safari browser). On the client, the subscribed application list in the package appears. If the user clicks one of the applications in the package, the VM switch 12 contains user id information for authentication. Afterwards, the data management center 14 acquires a VM frp, QVisor platform 15 via QVisor API 146. At this junction the application agent 157 activates the application. The MPT server then delivers the first application screen to the user's cell phone.

VM Switch

Figure 2:
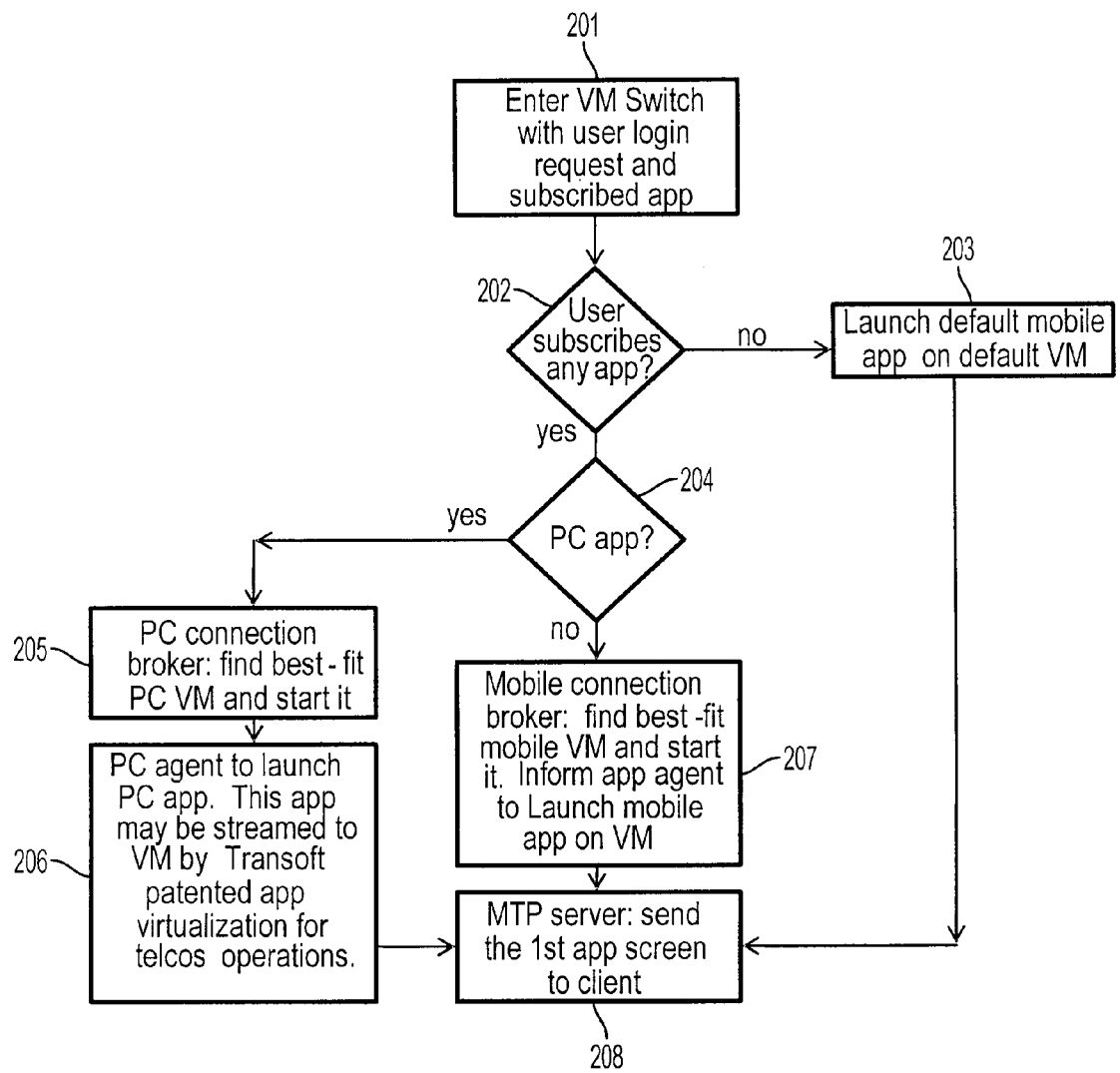
FIG. 2 is the work flowchart of VM switch 12 in FIG. 1A.

FIG. 2 provides the workflow of VM switch 12. VM switch workflow contains the followings:

Step 201, user enters VM Switch with user login request (user id and password) and subscribed application;

Step 202, see if user subscribes any app. If yes, enter Step 204. Otherwise, enter Step 203 first then Step 209;

Step 203, launch default mobile application on default cell phone VM. Practically allow user to obtain the OS desktop of mobile VM;

Step 204, decide if the subscription is a PC application. If yes, enter Step 205. Otherwise, enter Step 207;

Step 205, enter PC connection broker 1211. Find best-fit PC VM and start it. PC connection broker is further illustrated in FIG. 5;

Step 206, inform PC agent 131 to launch PC application. PC application agent is further illustrated in FIG. 29. In one embodiment, if a third-party VDI product is encapsulated, this application may be streamed (activated) to PC VM by applicant's patent CN101231 73A "A generalized application virtualization method for business use on the web, and the mini server using this method";

Step 207, enter mobile connection broker 1212: find best-fit mobile VM and start it. Inform cell application agent 157 to launch mobile application on VM; the flowchart of mobile connection broker is further illustrated in FIG. 5;

Step 208, MTP server 153 sends the 1st application screen to client.

Figure 3:
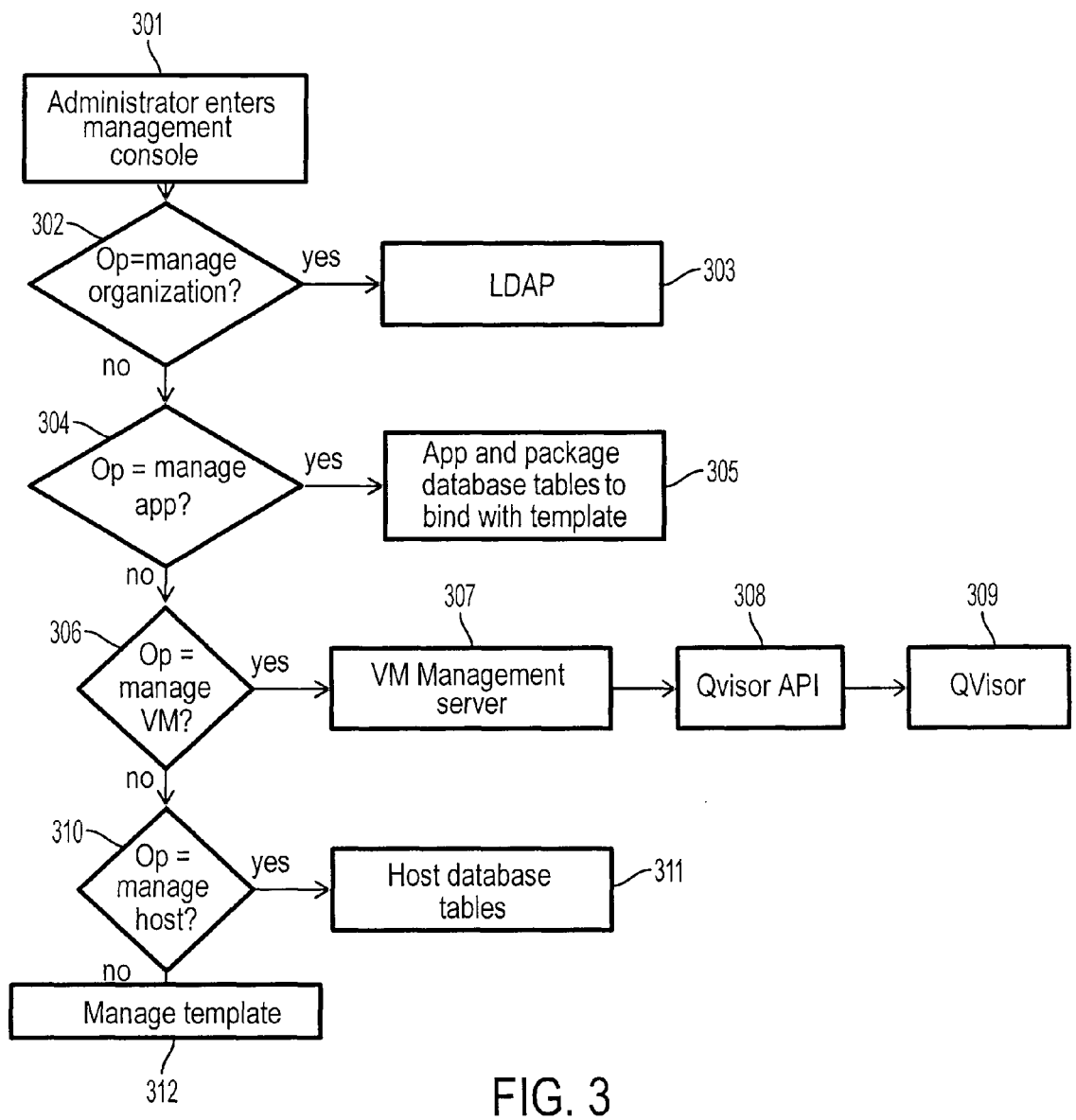
FIG. 3 is the flowchart of management console 142 in FIG. 1A. It also provides the personnel and organization management 122, application and package management 123, and VM server and template management 124 in FIG. 1.
Figure 4:
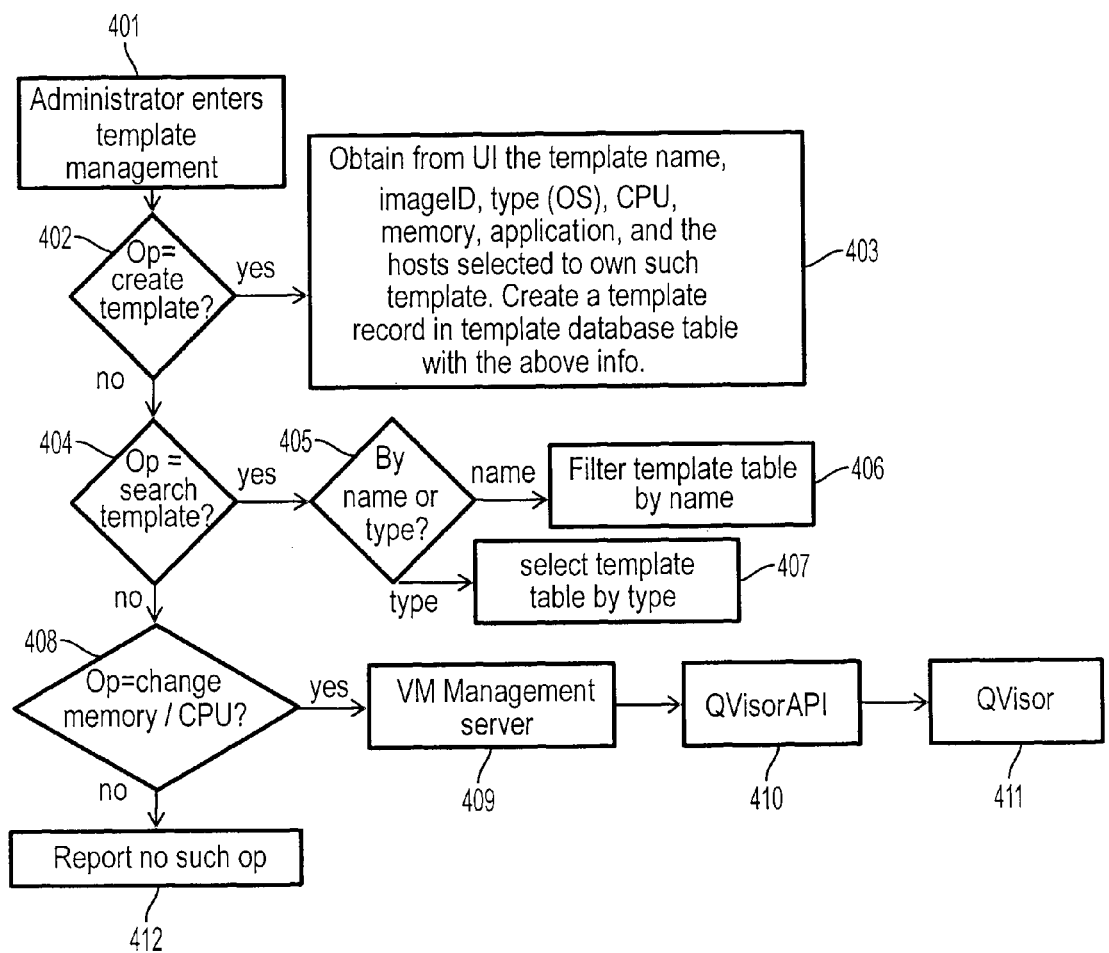
FIG. 4 is the flowchart of step 312 template management in FIG. 3.

FIG. 2 starts the explanation of the whole system flow from a user angle. When Step 202 decides if the user subscribes any application, the system needs to access the databases of personnel/organization and application/package at the data management center. Therefore, FIG. 3 follows next to explain data management center. FIG. 4 is related to FIG. 3 illustrates one other function (template management) of the data management center. In the process of explanation, the insertion of administrator operations like FIG. 3 and FIG. 4 is purely for convenience. If the reader still needs to see the whole system flow from a user's angle, simply jump to FIG. 5.

Data Management Center

FIG. 3 provides the workflow of management console 142. Management Console is a way to realize Resource Management System (RMS). The concept of a resource management system is a unified management system for personnel, organization, template, VM, application, package, and server. In the past, Microsoft Active Directory (AD) is prevalent for personnel management. However, for cell phone users scattering anywhere, there is no need of AD management. On the contrary, the "non-AD" Light-weighted Directory Access Protocol (LDAP) may be used to manage personnel and organization. One further step is to realize multi-organization, multi-tenant database to fit the need of mobile service provider. VMI management console 142 integrates these resources in a single system, while the backend is realized with various resource database. The workflow includes:

Step 301, administrator enters management console 142. The console provides an interactive interface for administrator operations;

Step 302, see if the operation is to manage personnel/organization. If yes, enter Step 303. Otherwise, enter Step 304;

Step 303, proceed with Light-weighted Directory Protocol (LDAP), where the personnel and organization database 122 of the VM switch 12 is accessed;

Step 304, see if the operation is to manage application/package. If yes, enter Step 305. Otherwise, enter Step 306;

Step 305, access application and package database 123 of VM switch 12;

Step 306, see if the operation is to manage VM. If yes, enter Step 307. Otherwise, enter Step 310;

Step 307, enter VM Server manager. For details see FIG. 10. The summarized process is to enter Step 308, QVisor API 146, then enter Step 309 to execute host OS commands in QVisor host 151;

Step 308, the various functions coming from the VM server manager of Step 307 will use QVisor API 146 via web services to create, start, stop, delete . . . VM;

Step 309, in QVisor host 151, execute the creation or destroy of the child process of QEMU 153 and the guest OS 157 on the QEMU;

Step 310, see if the operation is to manage QVisor host. If yes, enter Step 311. Otherwise, enter Step 312;

Step 311, access QVisor host database;

Step 312, proceed to manage template. For details see FIG. 4 next and its related description.

Template Management

FIG. 4 is the flowchart to manage template. The concept of template management is to bind template with the configuration information of VM, memory, CPU, application, host, and cell OS. It is different from VDI in that, the template is no longer constrained by AD or other network management tool (e.g. no worry to enter or exit AD domain). Multiple VMs can have same template.

Step 401, administrator enters template management;

Step 402, see if the operation is to create template. If yes, enter Step 403. Otherwise, enter Step 404;

Step 403, from the console interface, obtain template name, image ID (related to the path of image storage location), template type (i.e. different cell OS), memory, CPU, application, and the host designated by the user to store the template information as a template record in the template database table;

Step 404, see if the operation is template search. If yes, enter Step 405. Otherwise, enter Step 408;

Step 405, see if search by name or type. If by name, enter Step 406. Otherwise, enter Step 407;

Step 406, use name to filter template database table;

Step 407, user type to search template database table;

Step 408, decide if the operation is to change memory or CPU. If yes, enter Step 409. Otherwise, enter Step 412;

Step 409, enter VM server management. For details see FIG. 10 and its related description. The summarized process is to enter Step 410, QVisor API 146, then enter Step 411 to change memory and CPU in the QVisor host 151;

Step 410, the memory-and-CPU-changing functions coming from the VM server manager of Step 409 will use QVisor API 146 via web services to change memory and CPU;

Step 411, change the configuration of guest OS memory size and number in the QVisor host 151;

Step 412, report illegal operation.

Connection Broker

Figure 5:
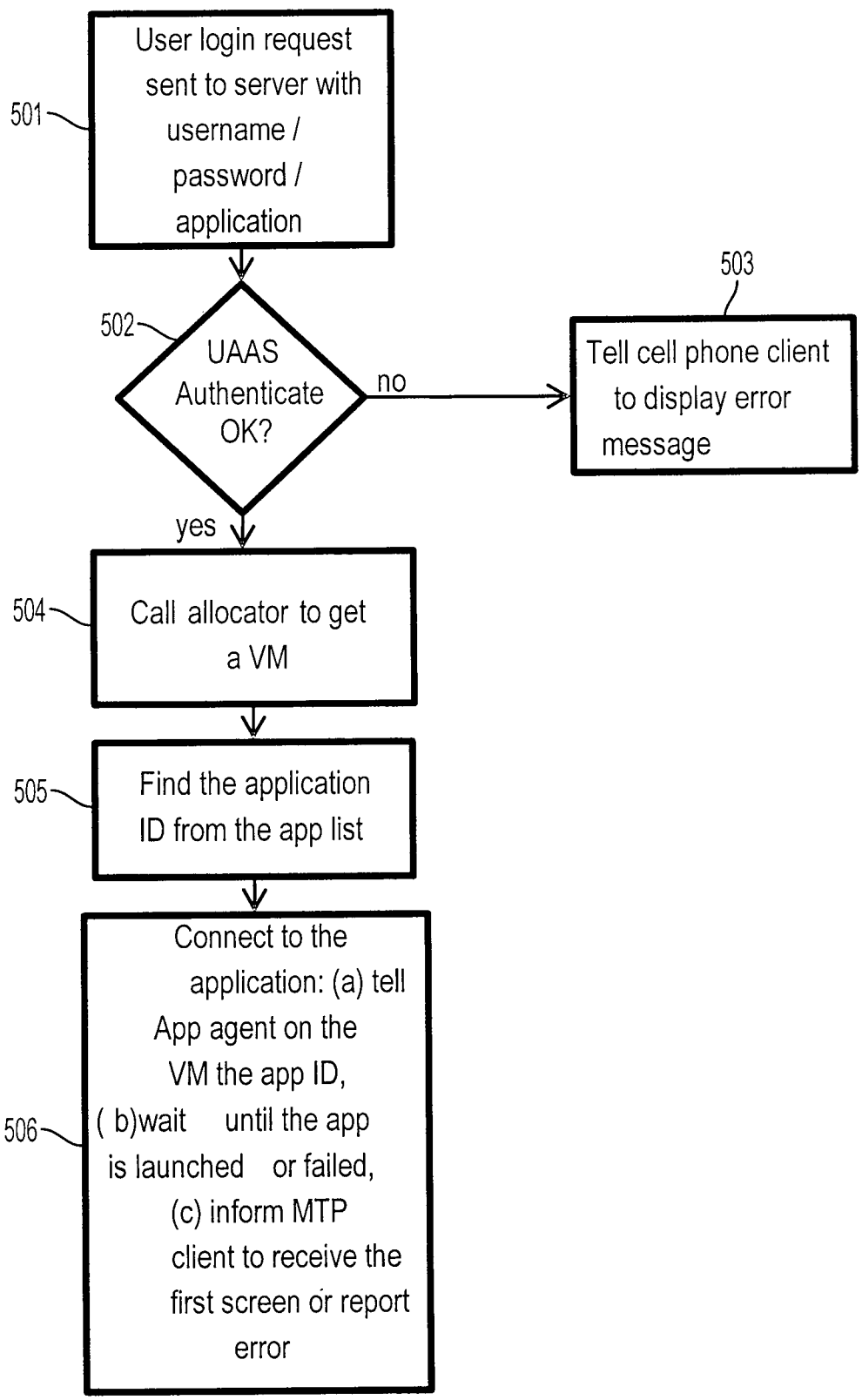
FIG. 5 is the flowchart of connection broker 121 in FIG. 1A.

FIG. 5 is the flowchart of connection broker. There are two types of connection broker: PC connection broker and cell connection broker. Their flowcharts is conceptually the same, except that PC connection needs to connect to various third-party VDI products, hence different requirements. In general, because the launch time for cell application is fairly quick, the waiting of cell connection broker for the backend application screen is not a problem. PC connection broker 1211 is one component of VDI socket.

Step 501, user login request sent to server with username/password/application;

Step 502, see if the user passes UAAS authentication and authorization. For details see FIG. 6. If yes, enter Step 504. Otherwise, enter Step 503;

Step 503, tell cell phone client to display error message;

Step 504, call VM allocator 141 to get a VM. For details see FIG. 7;

Step 505, find the application ID from the application list;

Step 506, connect to the application: (a) tell Application agent 157 on the VM the subscribed application ID, (b) wait until the application is launched or failed, (c) inform MTP client 111 to receive the first screen or report error.

Figure 6:
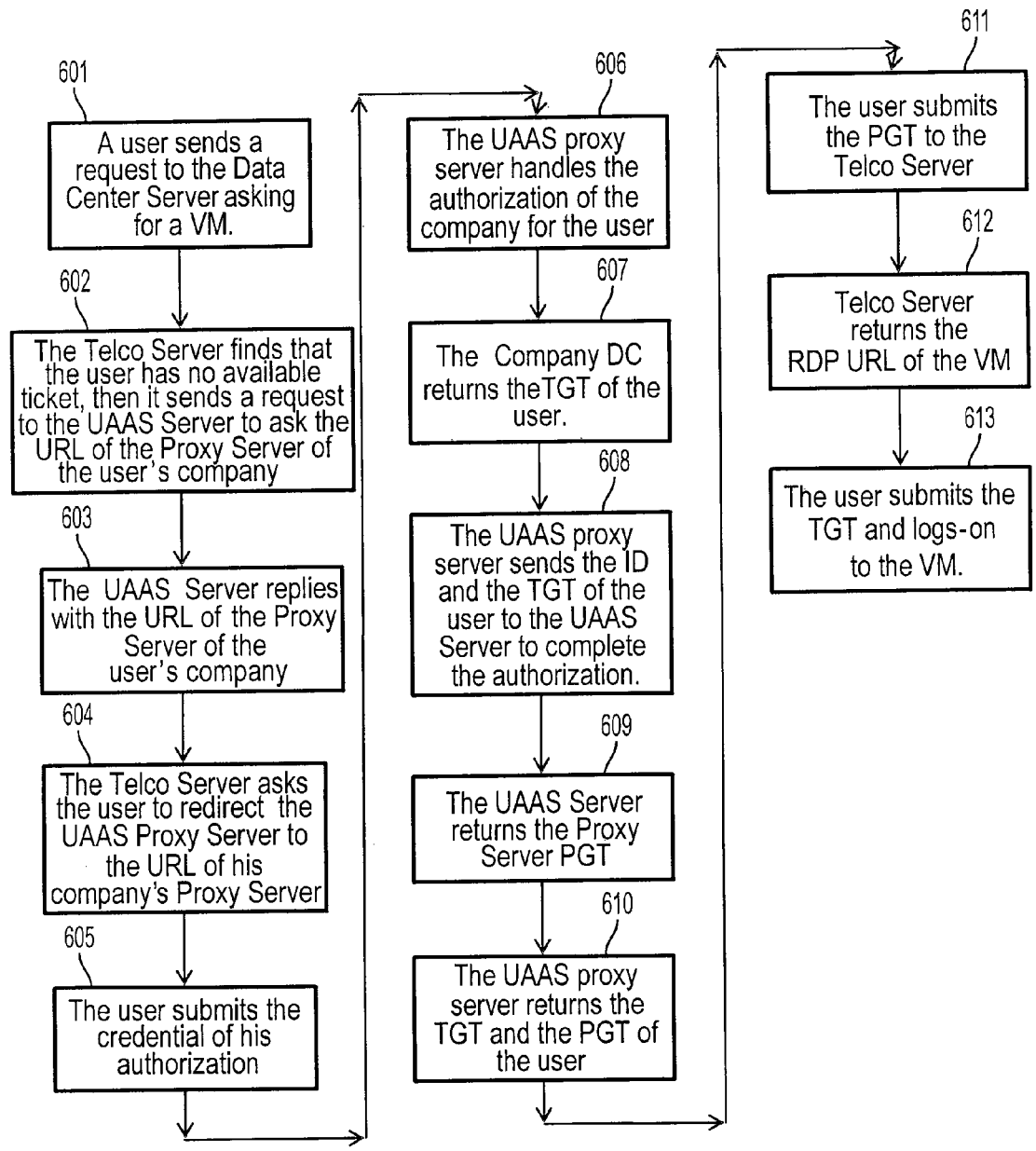
FIG. 6 is the flowchart of step 502 Unified Authentication and Authorization (UAAS) in FIG. 5.

FIG. 6 is the flowchart of Unified Authentication and Authorization System, (UAAS). UAAS is used to execute Kerberos secure communication protocol and Single Sign-On (SSO). Kerberos is mainly used in the user authentication when accessing computer network. Users only need to input authentication information once (SSO), then rely the ticket-granting ticket (TGT) obtained from the authentication to visit multiple services. Because of the shared key established between Client and Service, the protocol is therefore secure enough.

Step 601, a user sends a request to the Data Center Server asking for a VM;

Step 602, the Telco Server finds that the user has no available ticket. It then send a request to the UAAS Server to ask the URL of the Proxy Server of the user's company;

Step 603, the UAAS Server replies with the URL (Uniform Resource Locator) of the Proxy Server of the user's company;

Step 604, the Telco Server asks the user to redirect the UAAS Proxy Server to the URL of his company's Proxy Server;

Step 605, the user submits the credential of his authorization;

Step 606, the UAAS proxy server handles the authorization of the company for the user;

Step 607, the Company DC returns the TGT of the user. DC is the brief for LDAP's Domain component;

Step 608, the UAAS proxy server sends the ID and the TGT of the user to the UAAS Server to complete the authorization;

Step 609, the UAAS Server returns the Proxy Server PGT;

Step 610, the UAAS proxy server returns the TGT and the PGT of the user;

Step 611, the user submits the PGT to the Telco Server;

Step 612, Telco Server returns the RDP URL of the VM;

Step 613, the user submits the TGT and logs-on to the VM.

VM Management and Allocation

Figure 7:
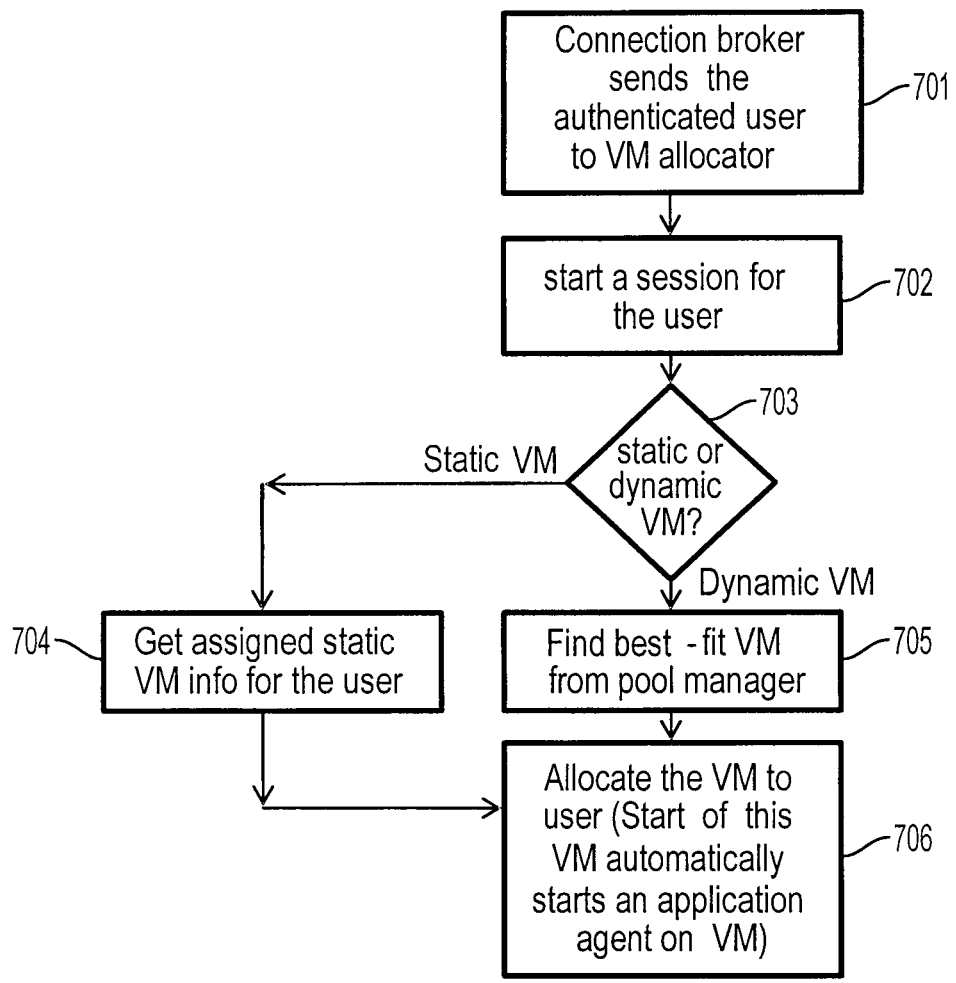
FIG. 7 is the flowchart of VM allocator 141 in FIG. 1A.

FIG. 7 is the flowchart of VM Allocator. VM Allocator 141 builds session, dispatch VM pool manager 143 to acquire the best-fit VM, and allocate VM to the user. The workflow is as follows:

Step 701, connection broker 121 sends the authenticated user to VM allocator 141;

Step 702, VM allocator 141 builds session for the user;

Step 703, see if static or dynamic VM. If static VM, enter Step 704. Otherwise, enter Step 705;

Step 704, get assigned static VM info for the user;

Step 705, find best-fit VM from pool manager. For details see FIG. 8;

Step 706, allocate the VM to user (Start of this VM automatically starts an application agent on VM, as shown in FIG. 1A).

Figure 8:
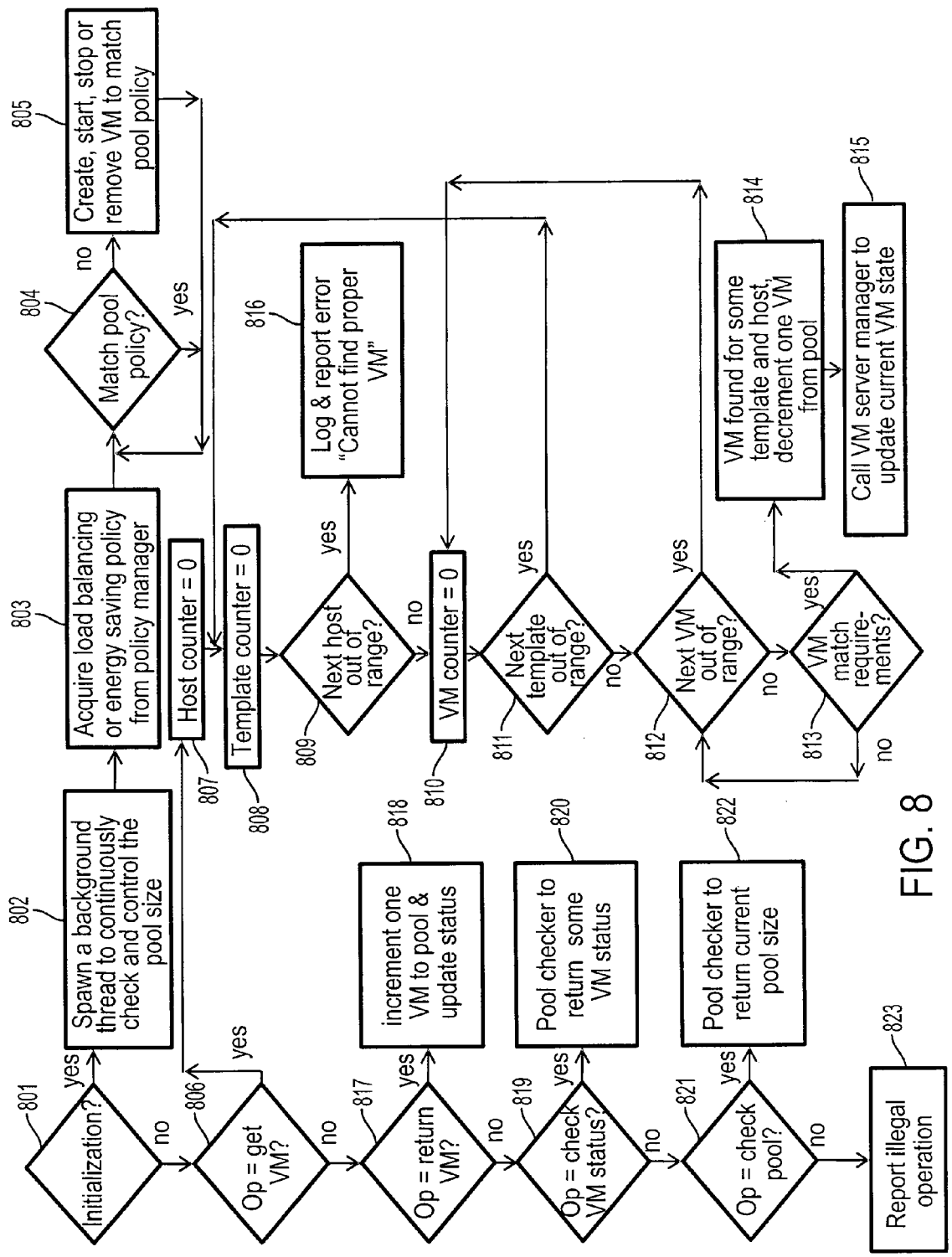
FIG. 8 is the flowchart of VM pool manager 143 in FIG. 1A.

FIG. 8 is the flowchart of VM pool manager. In the Figure, the workflow is divided into two parts: one is the continuously-running Background Worker to check if the pool size matches the requirements of policy manager. The other is various Services provided for VM allocator to acquire VM, return VM, check VM state, and check pool size. The reason to have the Background Worker is because cell VM can be started quickly from the hard disk. Therefore the background worker does not wait for long in the continuous iterations. Unlike the PC VM of VDI, because of the large image size, the start of PC VM often needs administrator manual operation. The workflow is as follows:

Step 801, see if the VM pool manager is in Initialization time. If yes, enter Step 802. Otherwise, enter Step 806;

Step 802, spawn a background thread to continuously check and control the pool size;

Step 803, acquire load balancing or energy saving policy from policy manager. For details see FIG. 9;

Step 804, see if pool policy matched. If yes, enter Step 805. Otherwise enter Step 804;

Step 805, create, start, stop or remove VM (for details see FIG. 10) to match policy;

Step 806, see if the service of VM pool manager is to get VM. If yes, enter Step 807. Otherwise, enter Step 817;

Step 807, host counter is set to 0;

Step 808, template counter is set to 0;

Step 809, see if the next host is out of range. If yes, enter Step 816. Otherwise, enter Step 810;

Step 810, VM counter is set to 0;

Step 811, see if the next template is out of range. If yes, enter Step 808. Otherwise, enter Step 812;

Step 812, see if the next VM is out of range. If yes, enter Step 810. Otherwise, enter Step 813;

Step 813, see if the given VM matches requirements. If yes, enter Step 814. Otherwise, enter Step 812;

Step 814, VM found for some template and host. Decrement one VM from pool;

Step 815, call VM server manager to update current VM state;

Step 816, log & report error "Cannot find proper VM";

Step 817, see if the service of VM pool manager is to return VM. If yes, enter Step 818. Otherwise, enter Step 819;

Step 818, increment one VM to pool & update status;

Step 819, see if the service of VM pool manager is to check VM state. If yes, enter Step 820. Otherwise, enter Step 821;

Step 820, VM pool checker to return some VM status;

Step 821, see if the service of VM pool manager is to check VM pool. If yes, enter Step 822. Otherwise, enter Step 823;

Step 822, VM pool checker to return current pool size;

Step 823, report illegal operation.

Figure 9:
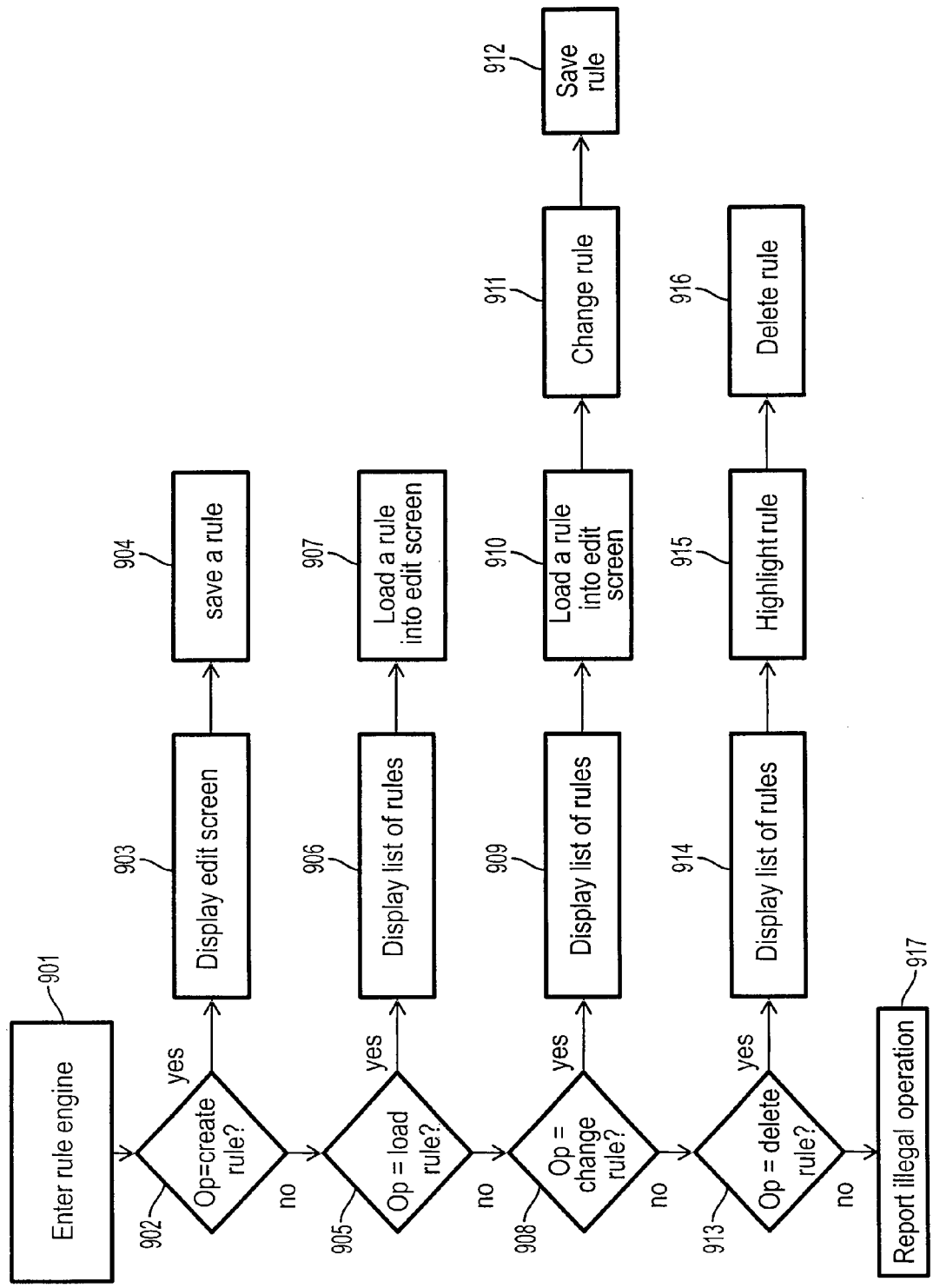
FIG. 9 is the flowchart of step 802 policy manager in FIG. 8.

FIG. 9 gives the flowchart of policy manager (i.e. rule engine). The policies of VM pool are generated by rule engine. These rules are written a compiled by programmer, technical support, or data center administrator with high-level language (such as Groovy).

Step 901, enter rule engine;

Step 902, see if the operation is to create rule. If yes, enter Step 903. Otherwise, enter Step 905;

Step 903, display edit screen;

Step 904, save rule;

Step 905, see if the operation is to load rule. If yes, enter Step 906. Otherwise, enter Step 908;

Step 906, display rule list;

Step 907, load rule to edit screen;

Step 908, see if the operation is to edit rule. If yes, enter Step 909. Otherwise, enter Step 913;

Step 909, display rule list;

Step 910, load rule to edit screen;

Step 911, edit rule;

Step 912, save rule;

Step 913, see if the operation is to delete rule. If yes, enter Step 914. Otherwise, enter Step 917;

Step 914, display rule list;

Step 915, when a rule is selected by the user, highlight this rule;

Step 916, delete rule;

Step 917, report illegal operation.

Figure 10:
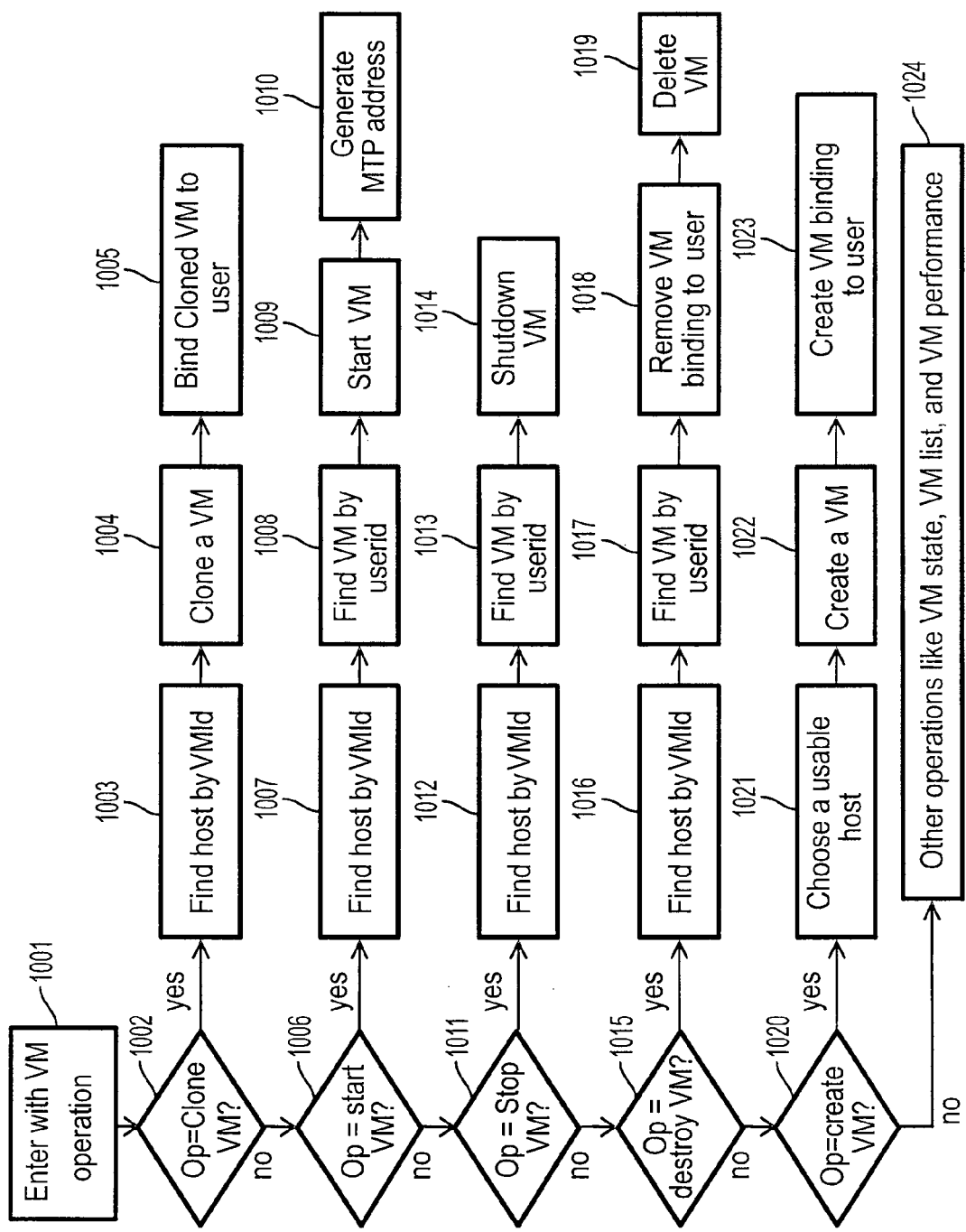
FIG. 10 is the flowchart of step 145 VM server manager in FIG. 1A.

FIG. 10 is the flowchart of VM server manager. Although the QVisor platform has multiple hosts running simultaneously, these hosts are managed by VM server manager 145. VM server manager 145 maintains the host database tables. Each VM and its state are governed by its QVisor host 151. VM server manager provides many VM operations, as follows:

Step 1001, enter with VM operation;

Step 1002, see if the operation is to clone VM. If yes, enter Step 1003. Otherwise, enter Step 1006;

Step 1003, look for host from database by VM Id;

Step 1004, clone VM via the QVisor API 146. For details see FIG. 12;

Step 1005, bind the cloned VM to user;

Step 1006, see if the operation is to start VM. If yes, enter Step 1007. Otherwise, enter Step 1011;

Step 1007, look for host from database by VM Id;

Step 1008, look for VM from database by user name;

Step 1009, start VM via QVisor API 146. For details see FIG. 13;

Step 1010, generate MTP address;

Step 1011, see if the operation is to stop VM. If yes, enter Step 1012. Otherwise, enter Step 1015;

Step 1012, look for host from database by VM Id;

Step 1013, look for VM from database by user name;

Step 1014, stop VM via QVisor API 146. For details see FIG. 14;

Step 1015, see if the operation is to destroy VM. If yes, enter Step 1016. Otherwise, enter Step 1020;

Step 1016, look for host from database by VM Id;

Step 1017, look for VM from database by user name;

Step 1018, remove VM binding to user;

Step 1019, delete VM via QVisor API 146. For details see FIG. 15;

Step 1020, see if the operation is to create VM. If yes, enter Step 1021. Otherwise, enter Step 1024;

Step 1021, find an available host from database;

Step 1022, create VM via QVisor API 146. For details see FIG. 11;

Step 1023, proceed to bind created VM and the user;

Step 1024, proceed to other operations such as get VM state, list VM, get VM performance, etc.

QVisor APIs

FIG. 11-21 details QVisor API 146. Most of the APIs are simple operations of database and data structure. However, VM creation is to spawn a child process for QEMU and guest OS via the command of the host operating system (such as Linux or MS Windows), while VM destroy is to kill the child process.

Figure 11:
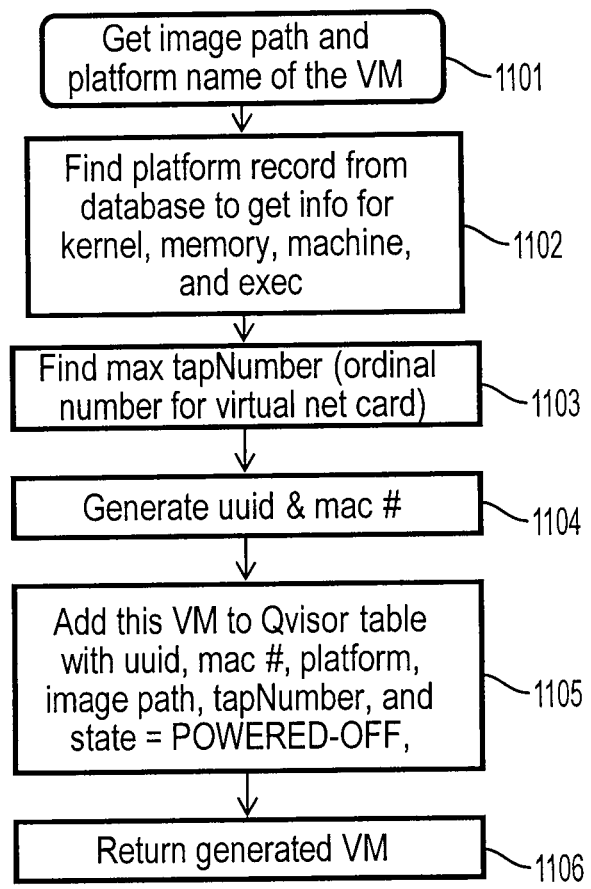
FIG. 11 is the flowchart of API "create VM" of QVisor 146 in FIG. 1A.

FIG. 11 gives the flowchart to create VM.

Step 1101, get image path and platform name of the VM;

Step 1102, from database, get platform record to obtain the values of kernel, memory, machine, and exe file name;

Step 1103, look for the maximum tapNumber (sequence number of virtual network card);

Step 1104, generate uuid and MAC number; UUID (Universal Unique Identifier) is the number generated on the host to guarantee the uniqueness in the same time and space, for all hosts. MAC (Media Access Control) address is burned in the Network Interface Card (NIC), also known as hardware address.

Step 1105, Add this VM to QVisor table with uuid, mac #, platform, image path, tapNumber, and state=POWERED-OFF;

Step 1106, return generated VM.

Figure 12:
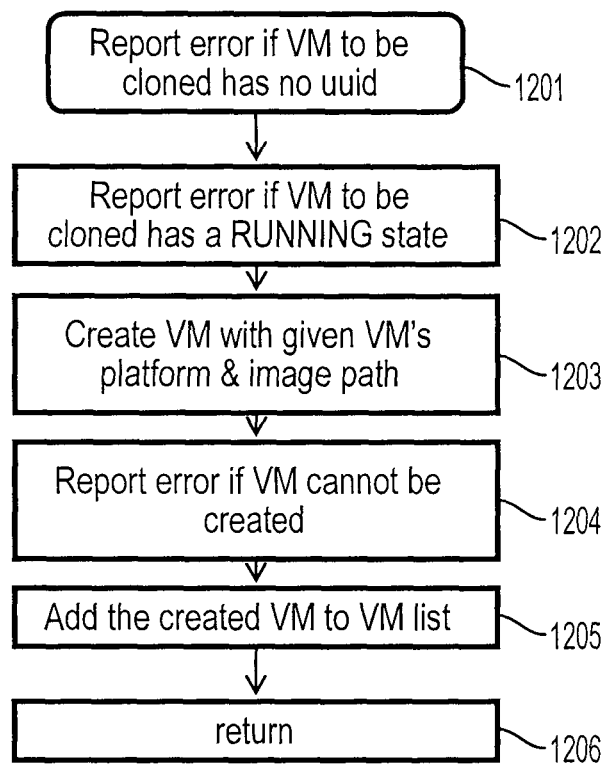
FIG. 12 is the flowchart of API "clone VM" of QVisor 146 in FIG. 1A.

FIG. 12 gives the flowchart to clone VM.

Step 1201, report error if VM to be cloned has no uuid;

Step 1202, report error if VM to be cloned has a RUNNING state;

Step 1203, create VM with given VM's platform & image path;

Step 1204, report error if VM cannot be created;

Step 1205, add the created VM to VM list;

Step 1206, return.

Figure 13:
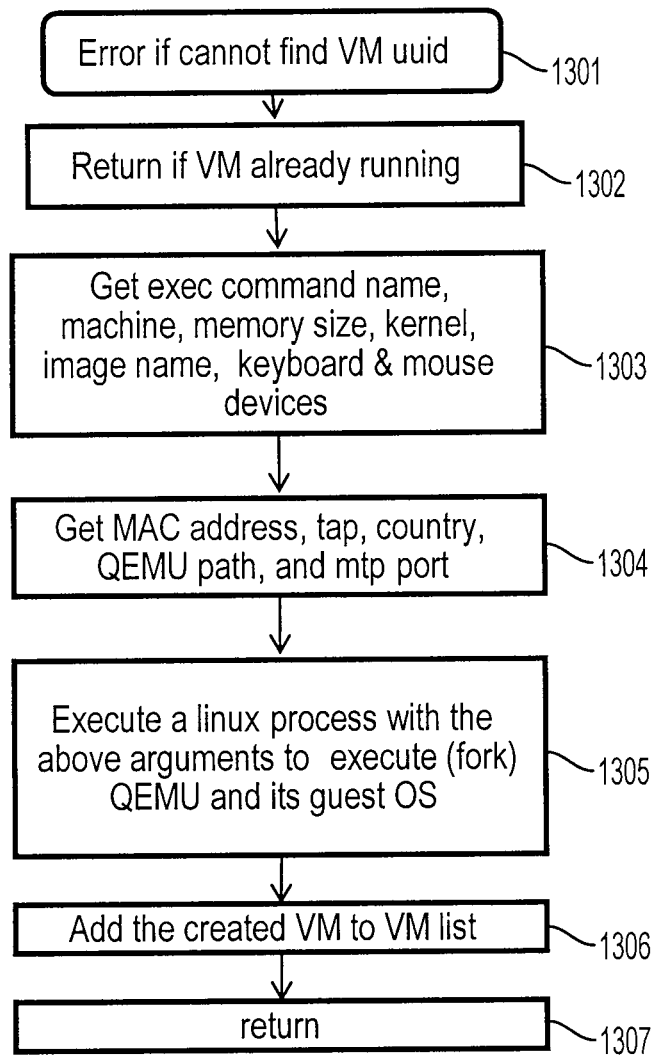
FIG. 13 is the flowchart of API "start VM" of QVisor 146 in FIG. 1A.

FIG. 13 give flowchart to start VM.

Step. 1301, report error if cannot find VM uuid;

Step 1302, return if VM is already running;

Step 1303, get exec command name, machine, memory size, kernel, image name, keyboard & mouse devices;

Step 1304, get MAC address, tap, country, QEMU path, and mtp port;

Step 1305, execute a child process with the above arguments to execute QEMU and its guest OS; the execution uses Linux command fork or Windows system call createProcess( ). These command build QEMU a child proces, while this process in turn launch its guest OS with these arguments.

Step 1306, add the created VM to VM list;

Step 1307, return.

Figure 14:
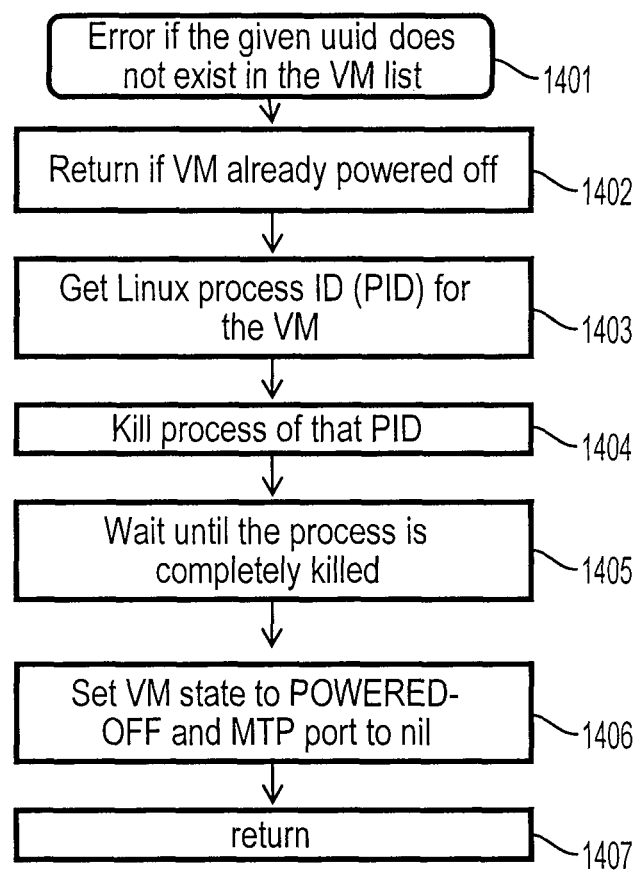
FIG. 14 is the flowchart of API "stop VM" of QVisor 146 in FIG. 1A.

FIG. 14 gives the flowchart to stop VM.

Step 1401, report error if the given uuid does not exist in the VM list;

Step 1402, return if VM already powered off;

Step 1403, get Linux process ID (PID) for the VM;

Step 1404, kill the child process of PID; execution uses Linux command "kill". "Kill" terminates QEMU along with its guest OS. For Windows operating system, use system call TerminateProcess( ).

Step 1405, wait until the process is completely killed;

Step 1406, set VM state to POWERED-OFF and MTP port to nil;

Step 1407, return.

Figure 15:
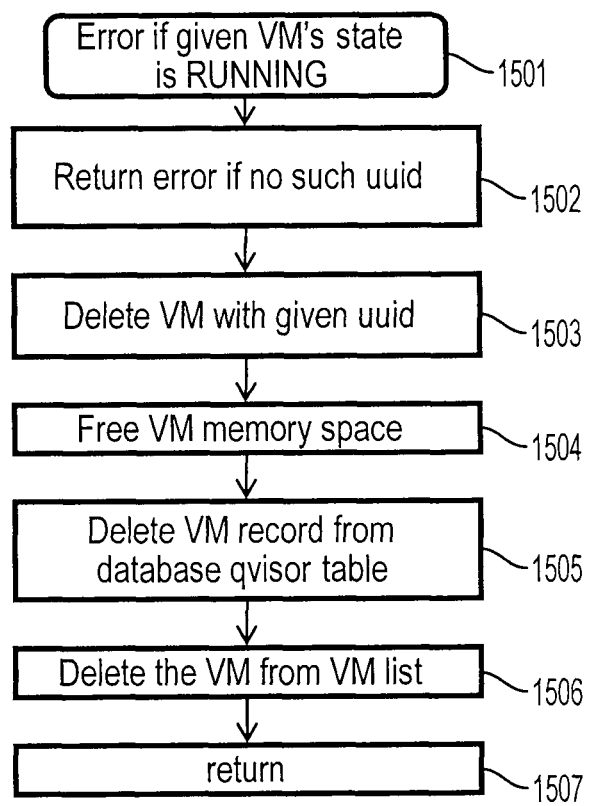
FIG. 15 is the flowchart of API "delete VM" of QVisor 146 in FIG. 1A.

FIG. 15 gives flowchart to delete VM.

Step 1501, report error if given VM's state is RUNNING;

Step 1502, return error if no such uuid;

Step 1503, delete VM with given uuid;

Step 1504, free VM memory space;

Step 1505, delete VM record from database QVisor table;

Step 1506, delete VM from VM list;

Step 1507, return.

Figure 16:
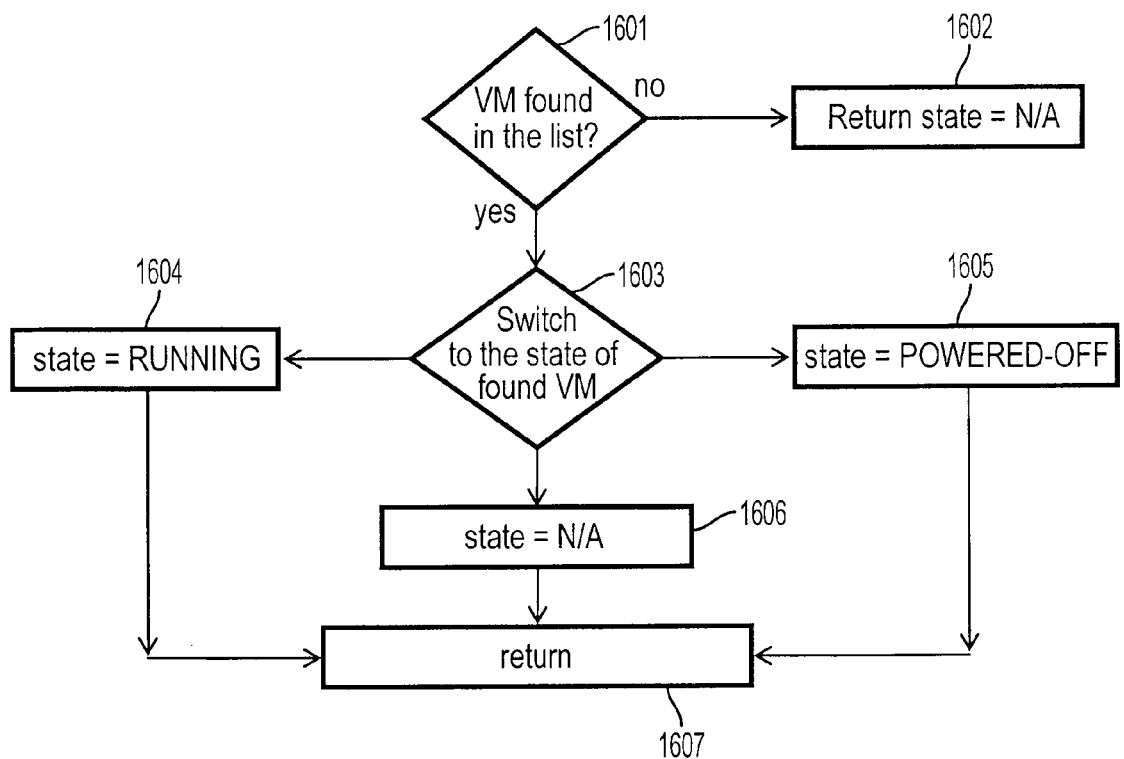
FIG. 16 is the flowchart of API "VM state" of QVisor 146 in FIG. 1A.

FIG. 16 gives flowchart to get VM state.

Step 1601, see if VM is found in the list. If yes, enter Step 1603. Otherwise, enter Step 1602;

Step 1602, return VM state=N/A;

Step 1603, switch to the VM state found. If the state is RUNNING, enter Step 1604. If the state is POWERED-OFF, enter Step 1605. If the state is N/A, enter Step 1606;

Step 1604, set VM state as RUNNING;

Step 1605, set VM state as POWERED-OFF;

Step 1606, set VM state as N/A;

Step 1607, return.

Figure 17:
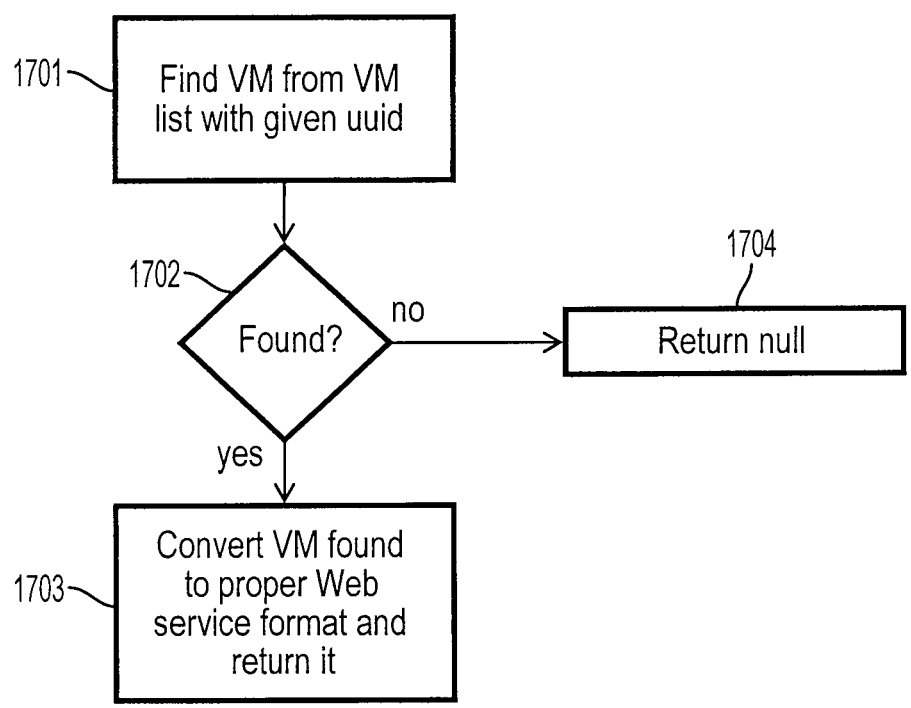
FIG. 17 is the flowchart of API "get VM" of QVisor 146 in FIG. 1A.

FIG. 17 gives the flowchart to get VM.

Step 1701, find VM from VM list with given uuid;

Step 1702, see if found in the list. If yes, enter Step 1703. Otherwise, enter Step 1704;

Step 1703, convert VM found to proper Web service format and return it; Step 1704, return null.

Figure 18:
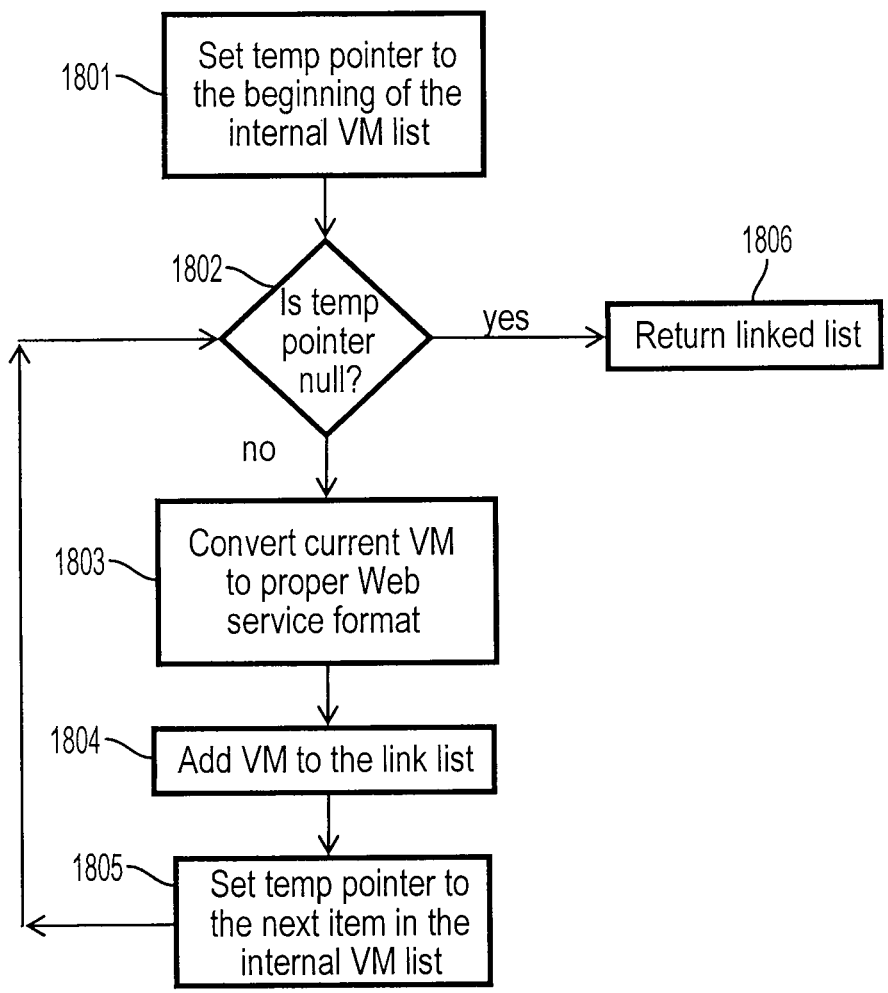
FIG. 18 is the flowchart of API "list VM" of QVisor 146 in FIG. 1A.

FIG. 18 gives the flowchart to list VM.

Step 1801, set temp pointer to the beginning of the internal VM list;

Step 1802, see if the current pointer is null. If yes, enter Step 1806. Otherwise, enter Step 1803;

Step 1803, convert current VM to proper Web service format;

Step 1804, add VM to the linked list;

Step 1805, set current pointer to the next item in the internal VM list, then enter Step 1802;

Step 1806, return linked list.

Figure 19:
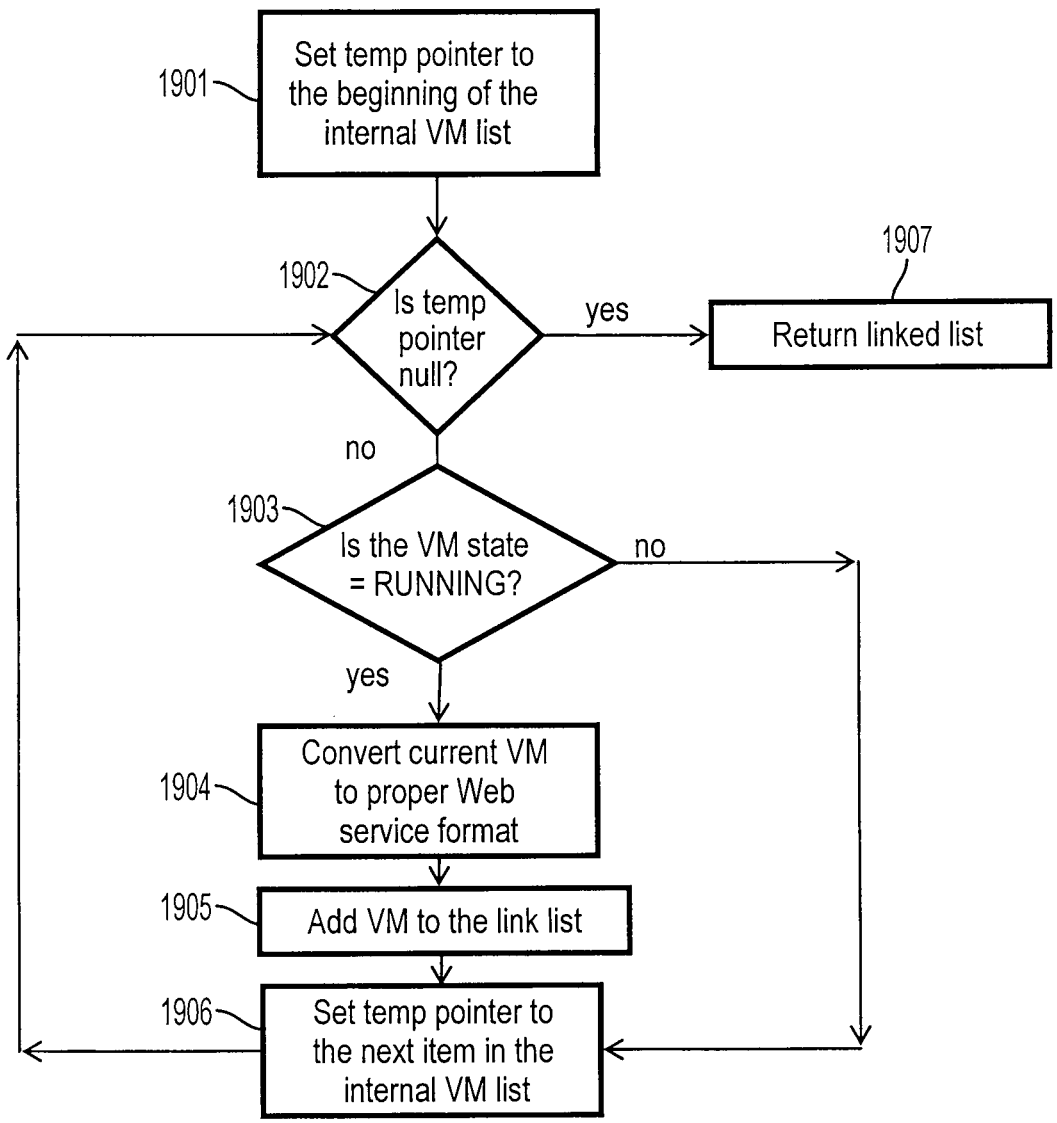
FIG. 19 is the flowchart of API "list running VM" of QVisor 146 in FIG. 1A.

FIG. 19 gives the flowchart to list running VMs.

Figure 20:
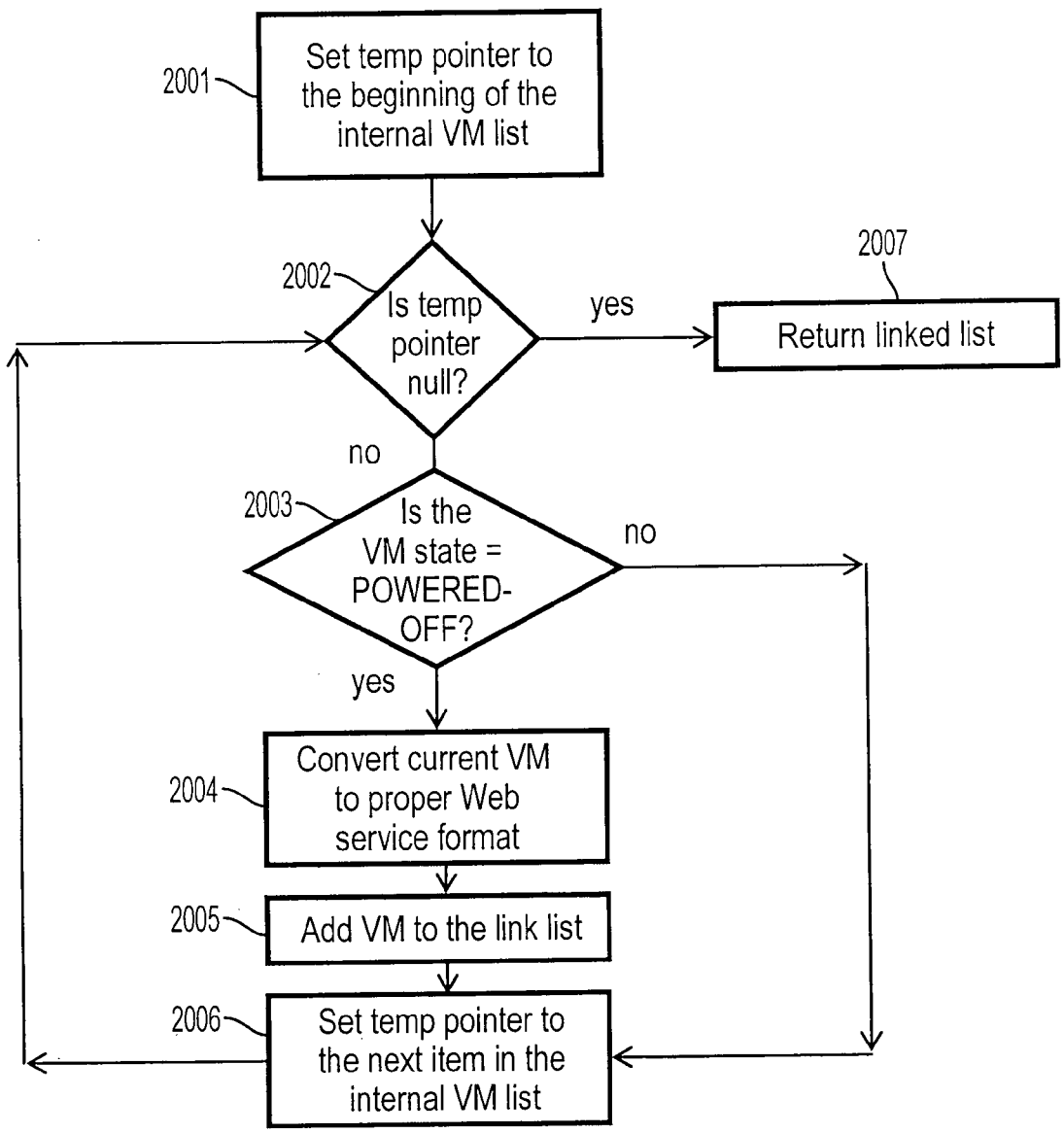
FIG. 20 is the flowchart of API "list off VM" of QVisor 146 in FIG. 1A.
Figure 21:
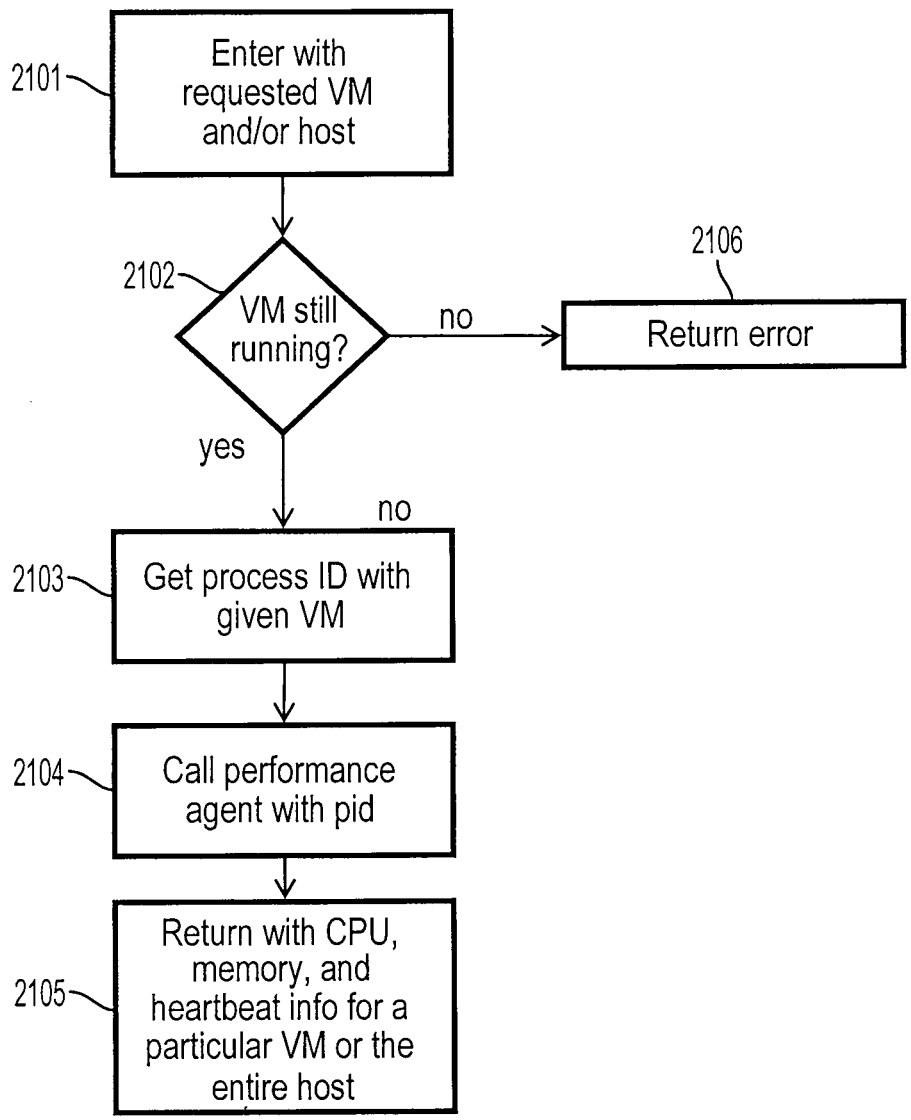
FIG. 21 is the flowchart of API "get VM performance" of QVisor 146 in FIG. 1A.

Step 1901, set current pointer to the beginning of the internal VM list;

Step 1902, see if current point is null. If yes, enter Step 1907. Otherwise, enter Step 1903;

Step 1903, see if current VM state is RUNNING. If yes, enter Step 1904. Otherwise, enter Step 1906;

Step 1904, convert current VM to proper Web service format;

Step 1905, add VM to the linked list;
Step 1906, set temp pointer to the next item in the internal VM list, then enter Step 1902;
Step 1907, return linked list.
FIG. 20 gives the flowchart to list off VMs.
Step 2001, set current pointer to the beginning of the internal VM list;
Step 2002, see if current pointer is null. If yes, enter Step 2007. Otherwise, enter Step 2003;
Step 2003, see if current VM state is POWERED-OFF. If yes, enter Step 2004. Otherwise, enter Step 2006;
Step 2004, convert current VM to proper Web service format;
Step 2005, add VM to the linked list;
Step 2006, set temp pointer to the next item in the internal VM list, then enter Step 2002;
Step 2007, return linked list.
FIG. 21 gives the flowchart to get VM performance.
Step 2101, enter with requested VM and/or host;
Step 2102, see if the VM state is RUNNING. If yes, enter Step 2103. Otherwise, enter Step 2106;
Step 2103, get process ID with given VM (PID);
Step 2104, call performance agent with PID. For details see FIG. 22;
Step 2105, return with CPU, memory, and heartbeat info for a particular VM or the entire host;
Step 2106, return error.

QVisor Platform

Figure 22:
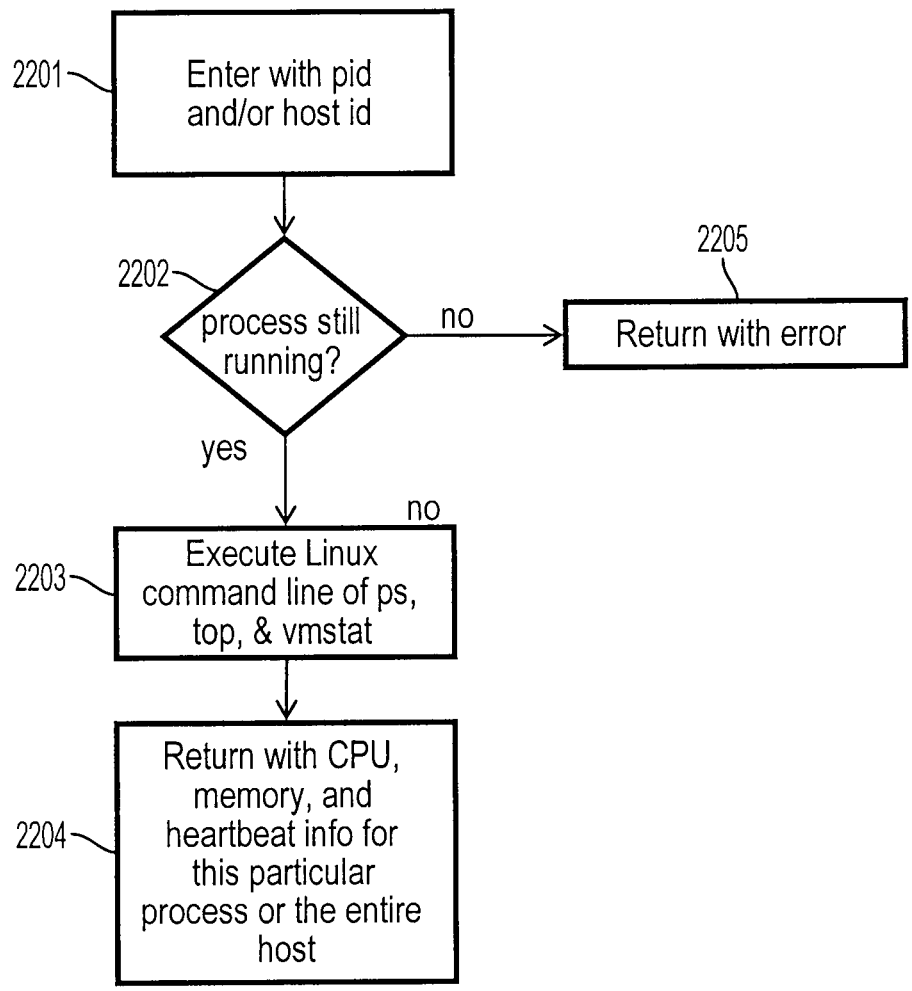
FIG. 22 is the flowchart of VM performance agent 155 in FIG. 1B.
Figure 23:
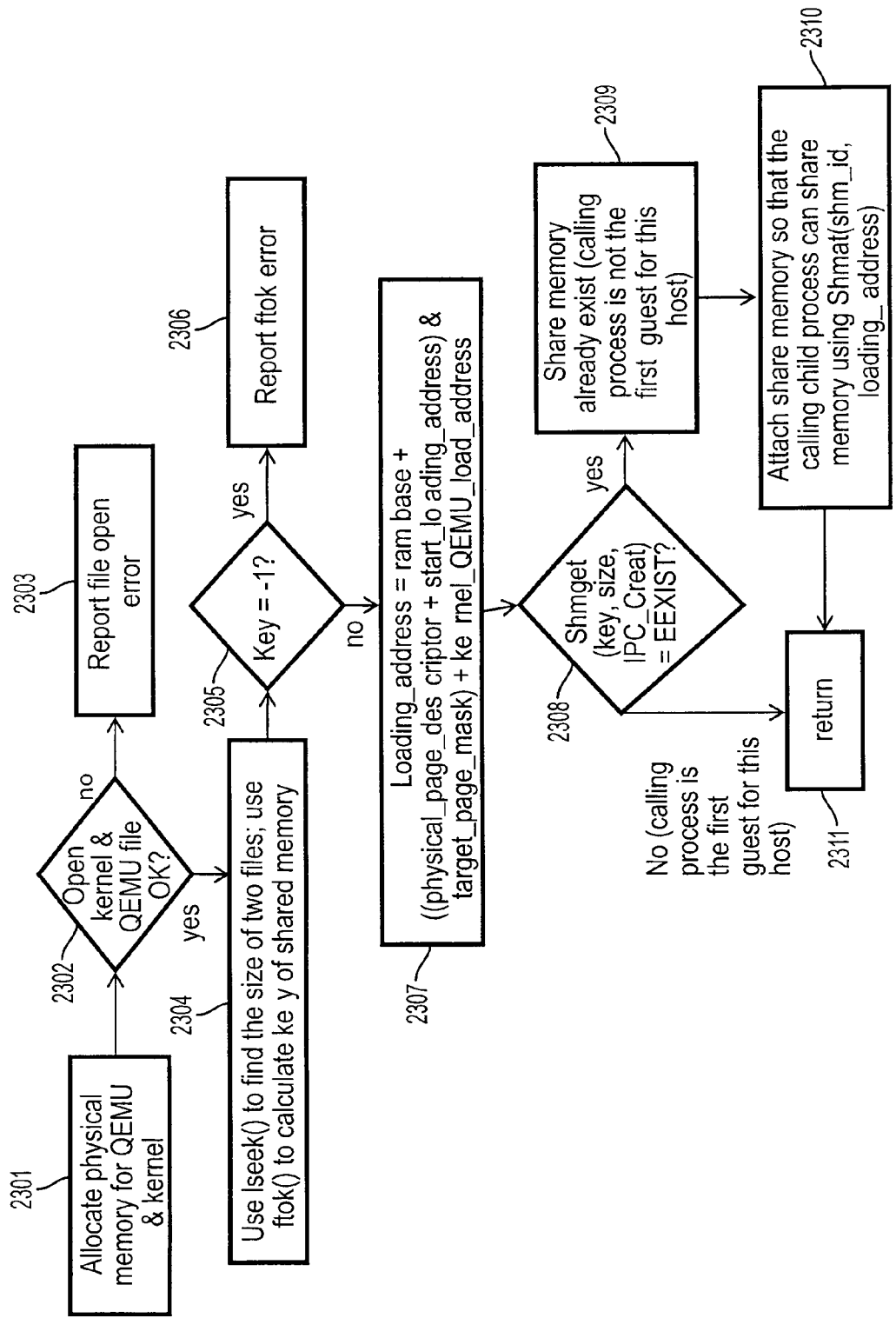
FIG. 23 is the partial flowchart of "shared QEMU and kernel" of QVisor host 151 in FIG. 1A.

FIG. 22-25 is the explanation of the features of QVisor platform. Because this invention takes the cell OS to run on the emulator QEMU, the optimization of QEMU to elevate the performance becomes important. On the other hand, this invention, through the combination of a few unique debugging tools, form a preprocessor for cell OS virtualization (FIG. 25), described as follows:

FIG. 22 gives the flowchart of performance agent. The performance agent 154 runs on top of QVisor host 151 OS platform. The cell OS itself may not have system interface for CPU/memory. Even if it does, this interface is related to non-physical, simulated CPU and memory. Therefore, the performance agent runs on top of host OS to monitor various cell OS performance and heartbeat. Performance agent execute commands of host OS (e.g. for Linux: "free", "top", "vmstat", "ps aux") to acquire utilization statistics for CPU and memory, as well as states of child process. If a child process has no response, application agent is capable to terminate it. The workflow is described as follows:
Step 2201, enter with PID and/or host id;
Step 2202, see if the child process PID is still running. If yes, enter Step 2203. Otherwise, enter Step 2205;
Step 2203, execute Linux command line of ps, top, & vmstat; ps is a Linux system command to display process states. The appended argument "ux" tells the utilization of CPU and memory for a running process. "Top" is another Linux system command with similar function to display process states, but in an interactive mode. "Vmstat" may be used to display more kernel threads, as well as statistical information of IO, virtual memory, and CPU Trap. If the host OS is Windows XP or Vista, the functions in the Windows Management Instrumentation (WMI) such as CollectingHighCPUUtilizationEvents( ) may be used to acquire the process states.
Step 2204, return with CPU, memory, and heartbeat info for this particular process or the entire host;
Step 2205, return with error.
FIG. 23 gives the flowchart of shared QEMU and kernel. Every guest OS itself occupies certain amount of memory. Same is hold for the memory of emulator QEMU. If the duplicated memory can be shared, the saved memory leaves space for more virtualized OSes. Moreover, cell OS has small size, and can be separated entirely from its system data. Therefore, a dual-CPU, 4G-memory X86 host capable running 2-4 PC VMs, can hold 60 or more cell VMs because of memory sharing. The workflow is as follows:
Step 2301, Allocate physical memory for QEMU & kernel;
Step 2302, see if open kernel & QEMU file OK. If OK, enter Step 2304. Otherwise, enter Step 2303;
Step 2303, report error "cannot open file";
Step 2304, use lseek( ) to find the size of QEMU+kernel files; use ftok( ) to calculate the key for memory sharing. lseek( ) is a function of C programming language, and can obtain the length of a file using its offset value, while ftok( ) is Linux system function to get key for a subsequent call to shmget( ) to share memory;
Step 2305, see if the value of Key is −1. If yes, enter Step 2306. Otherwise, enter Step 2307;
Step 2306, report ftok error;
Step 2307, calculate argument value for Shmat( ): Loading_address=ram base+(physical_page_descriptor+start_loading_address) & target_page_mask)+kernel_QEMU_load_address; This means the absolute memory address of guest OS is the sum of the following three quantities: (1) base address of cell phone random access memory (RAM), (2) the absolute address of translated physical memory address page, and (3) kernel/QEMU loading address;
Step 2308, shmget( ) is a Linux system function, usable to acquire or create a IPC shared memory segment associated with the value of the argument key. If the return value of Shmget (key, size, IPC_Creat) is EEXIST, enter Step 2309. Otherwise, enter Step 2311;
Step 2309, shared memory already exists (i.e. the calling child process is not the first child process on this host);
Step 2310, shmat( ) is a Linux system function, usable to attach a shared memory for a child process. Thus the subsequently-created child processes may use Shmat (shm_id, loading_address) to share memory with the first child process;
Step 2311, calling child process is the first child process on this host. Return.
Steps 2301-2311 provide a kernel-sharing solution for Linux. If the host runs Windows XP or Vista, the system services of memory management in the Win32 development environment is used to take guest OS and QEMU as a single child process, and then take function CreateFileMapping( ) to get its file handle. Subsequently, other child processes uses function OpenFileMapping( ) and the file handle obtained in the CreateFileMapping( ) function call to share the memory of the first child process.

Figure 24:
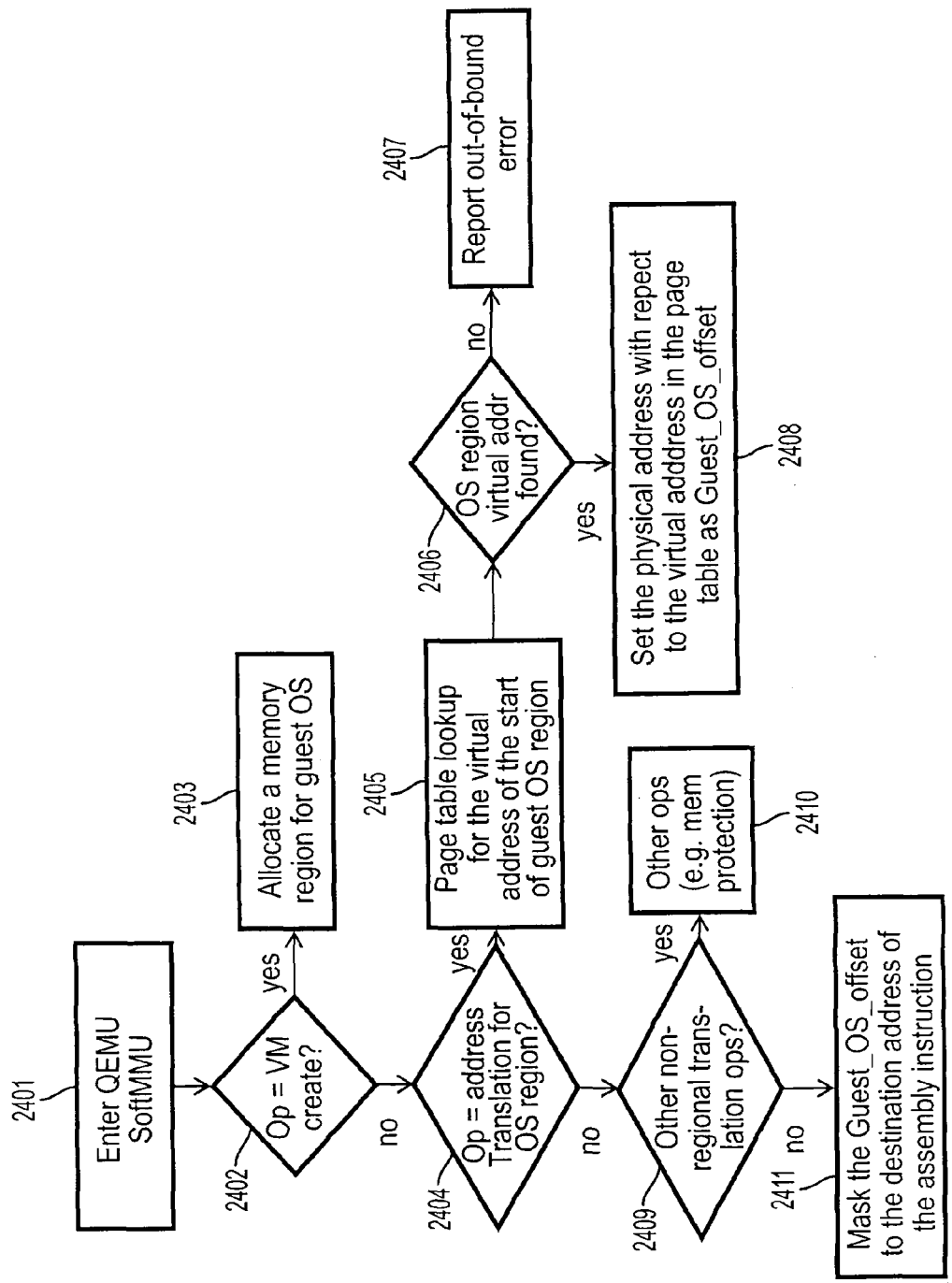
FIG. 24 is the flowchart of "Improved QEMU Soft MMU" of QVisor host 151 in FIG. 1A.

FIG. 24 gives the flowchart of an improved QEMU SoftMMU. With the QVisor configuration, memory management usually takes QEMU's emulated Memory Management Unit (MMU). This softMMU emulates the functions of MMU. For example, it uses software to realize address translation and memory protection. When user application addresses a memory location via MMU translation, QEMU works for an OS region to mask the result of a memory list search and translate the required virtual address into physical address. Such an improvement speeds up memory access ten-folds. The workflow is as follows:
Step 2401, enter QEMU SoftMMU;
Step 2402, see if the operation is to create VM. If yes, enter Step 2403. Otherwise, enter Step 2404;
Step 2403, allocate a memory region for the guest OS;

Step 2404, see if the operation is to translate address for guest OS. If yes, enter Step 2405. Otherwise, enter Step 2409;

Step 2405, Page table lookup for the virtual address of the start of guest OS region;

Step 2406, see if OS region virtual address is found. If yes, enter Step 2408. Otherwise, enter Step 2407;

Step 2407, report out-of-bound error;

Step 2408, Set the physical address with repect to the virtual adddress in the page table as Guest_OS_offset;

Step 2409, see if the operation is other non-regional translation operations. If yes, enter Step 2410. Otherwise, enter Step 2411;

Step 2410, other ops (e.g. mem protection);

Step 2411, mask the Guest_OS_offset to the destination address of the assembly instruction.

Figure 25:
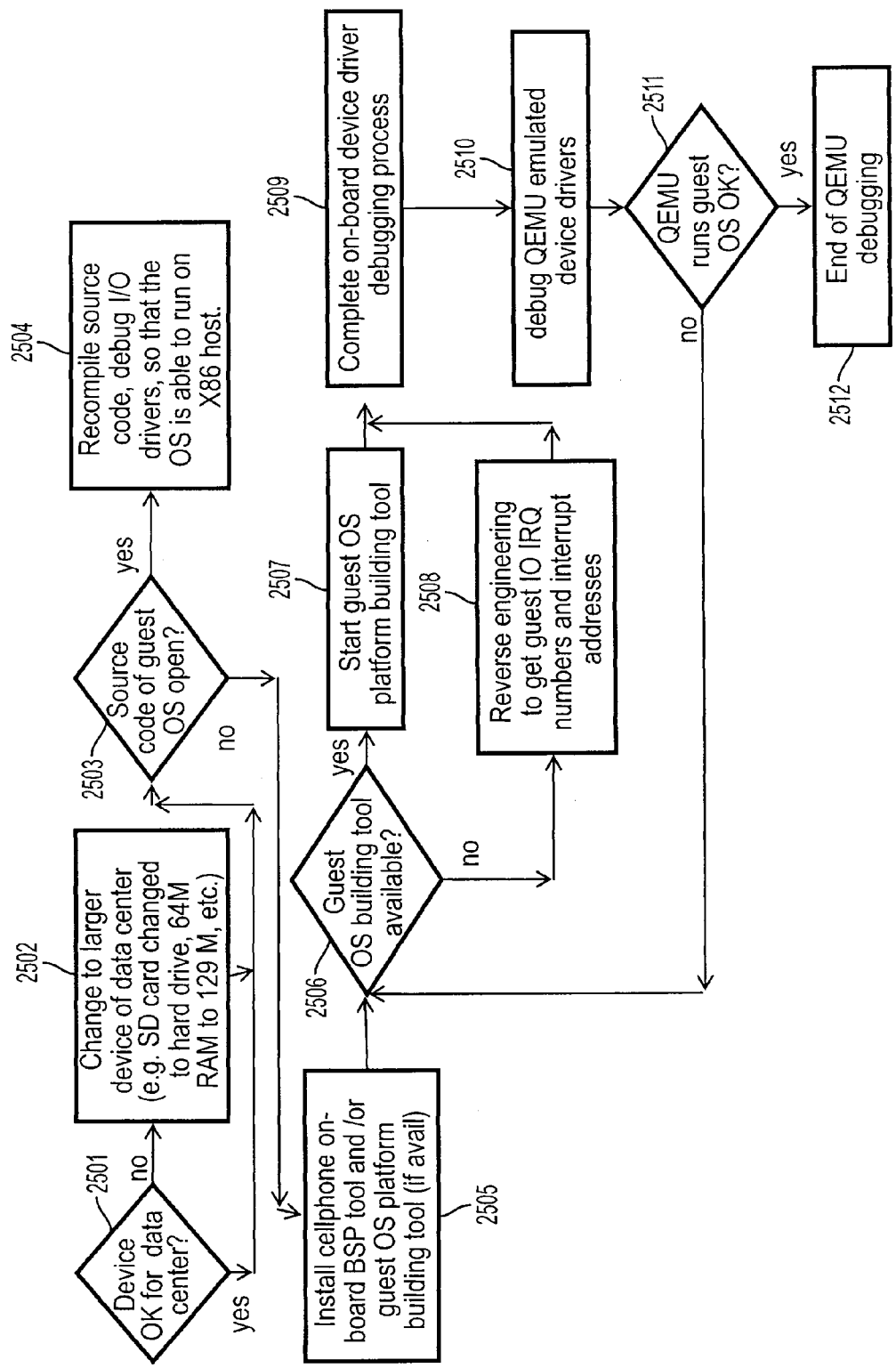
FIG. 25 is the flowchart of "I/O Device Debugging Pre-Processor" of QVisor host 151 in FIG. 1A.

FIG. 25 gives the flowchart of I/O device debugging pre-processor. If the performance of I/O devices supported by cell phone is slow in data center, they can replaced by appropriate data center devices. In one embodiment, the cell phone SD card can be replaced with mountable hard disk, and 64M RAM can be expanded to 129M. If the source code of guest OS is completely open and provided in high level language like C or java (e.g. gphone's Android), the code can be recompiled, and I/O adjusted, to run directly on the X86 host without QEMU emulation. This can greatly improve the performance. Otherwise, we need to install the industry-provided cell phone development board and BSP (for example, board support package of Samsung 2410) and debug from there. When debugging I/O drivers with QEMU-emulated general I/O hardware, we normally need WinCE or Win Mobile Platform Builder, while open source Android uses basic make tools. During debugging, both of I/O drivers and QEM-emulated peripherals may be modified. Without such tools, we then need to resort to reverse engineering. In light of this, the pre-processor here can adjust to suit different levels of openness of the cell phone OS. The workflow is as follows:

Step 2501, see if the device size is appropriate. If yes, enter Step 2503. Otherwise, enter Step 2502;

Step 2502, change to data-center large-size device (e.g. SD is replaced with hard disk, 64M RAM is expanded to 128 M, etc.), then proceed to Step 2503;

Step 2503, see if the source code of the cell phone OS is completely open. If yes, enter Step 2504. Otherwise, enter Step 2505;

Step 2504, recompile the source, and adjust I/O devices, so that the guest OS can run directly on X86 host;

Step 2505, install on-board BSP tool and guest OS platform building tools, if any;

Step 2506, see if the guest OS has platform building tools. If yes, enter Step 2507. Otherwise, enter Step 2508;

Step 2507, start guest OS platform building tools;

Step 2508, reverse engineering to obtain guest OS I/O IRQ number and interrupt addresses;

Step 2509, complete on-board peripheral driver debugging;

Step 2510, debug the driver of the hardware device emulated by QEMU;

Step 2511, see if QEMU can run guest OS. If yes, enter Step 2512. Otherwise, enter Step 2506;

Step 2512, complete QEMU debugging.

Mobile Terminal Protocol

Figure 26:
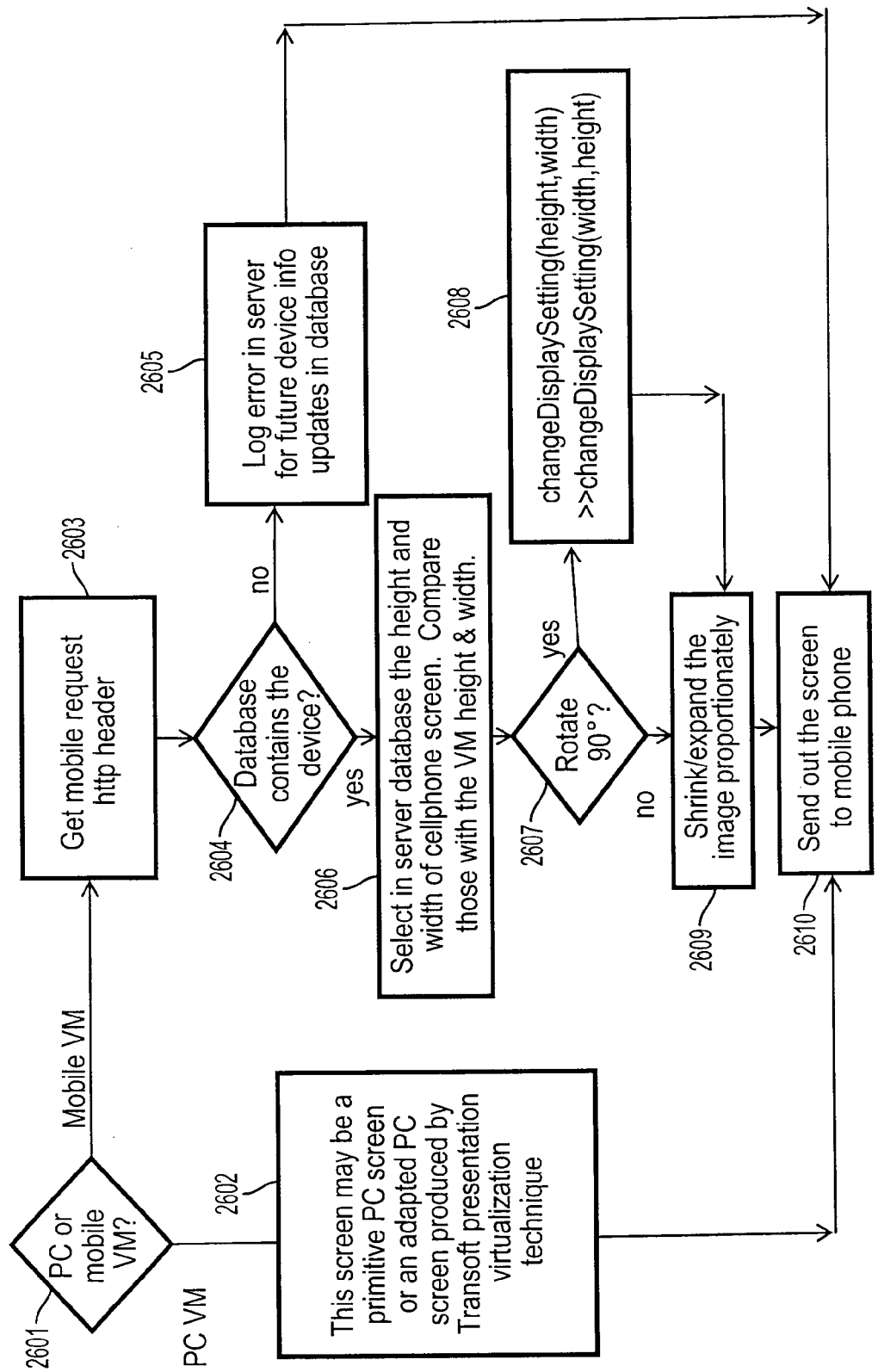
FIG. 26 is the partial flowchart of "Adapt to Mobile Screen" of MTP server 152 in FIG. 1B.
Figure 27:
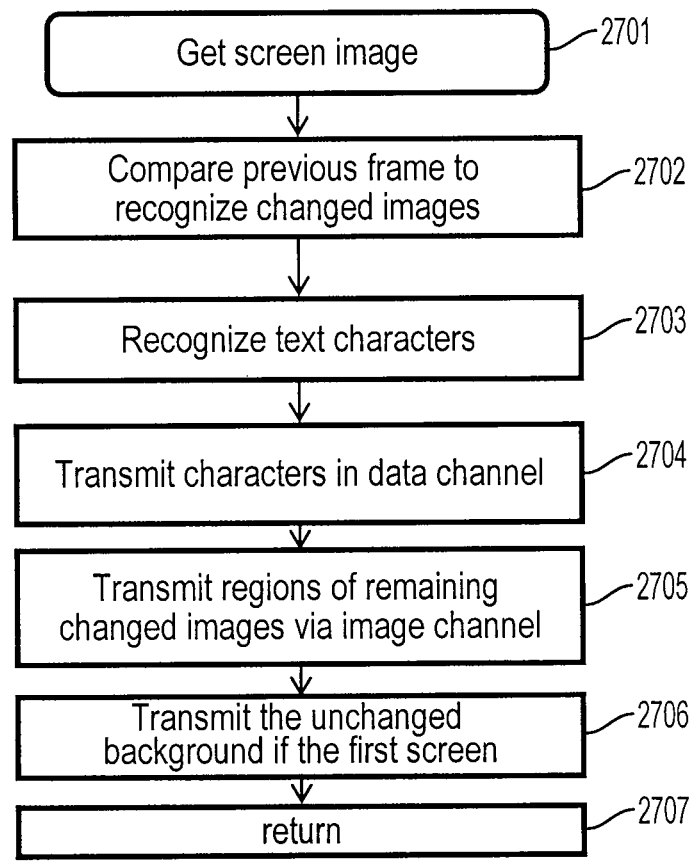
FIG. 27 is the partial flowchart of "Intelligent Screen Delivery" of MTP server 152 in FIG. 1B.
Figure 28:
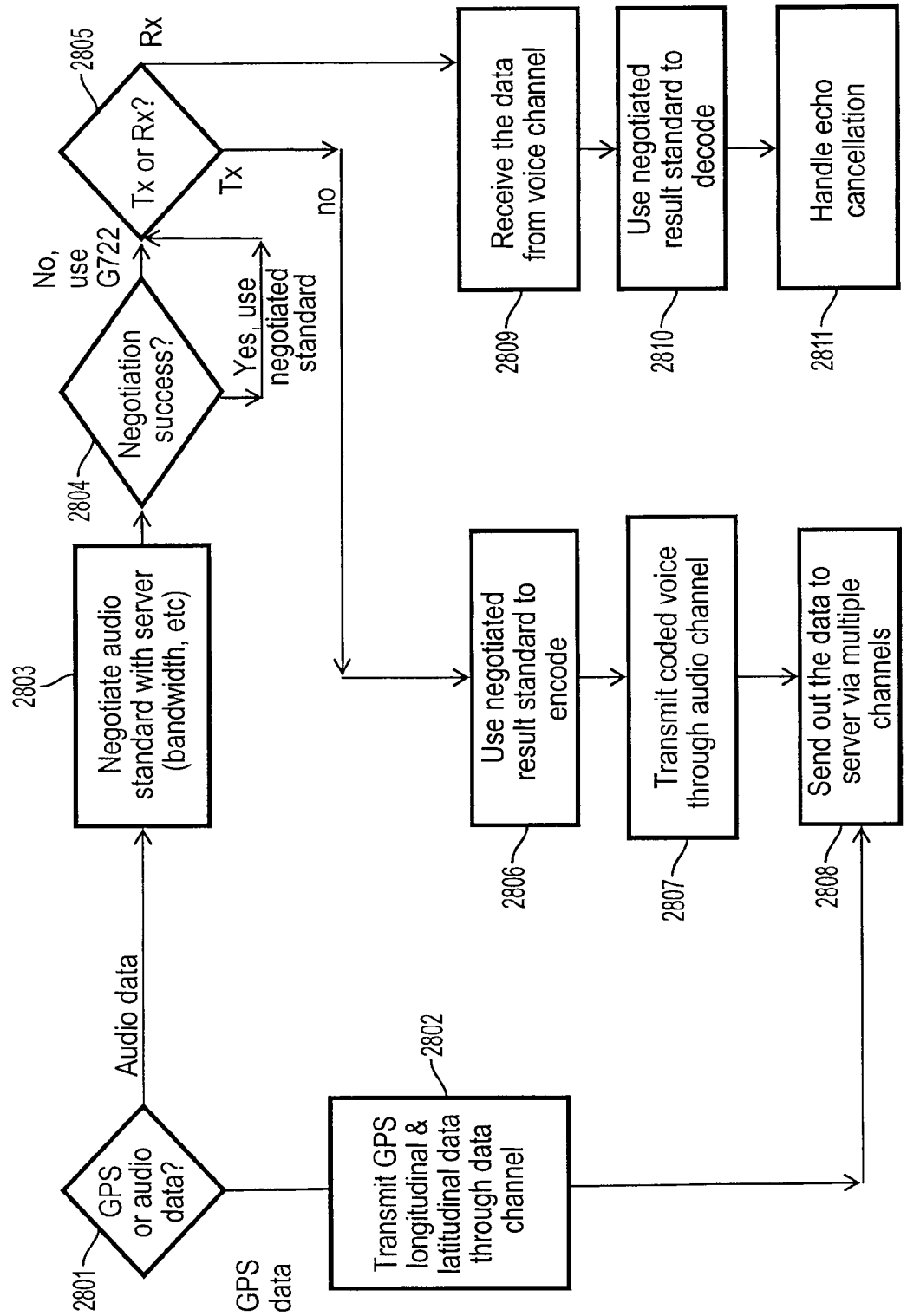
FIG. 28 is the partial flowchart of "Client Audio & GPS handler" of MTP client 111 in FIG. 1A.

FIGS. 26, 27, and 28 relate to the partial flowchart of Mobile Terminal Protocol (MTP). MTP is based on VDI remote terminal technology (e.g. the open source VNC, Microsoft RDP, or Citrix ICA), and is improved to adapt to the VMI requirements of this invention. We will not detail the basic terminal protocol technology, but cell phone requirements are screen adaptation (FIG. 26), intelligent screen delivery (FIG. 27), and audio/GPS data transfer (FIG. 28). The realization of MTP client is more complicated. For example, Win Mobile cell phone uses C++, J2ME cell phone uses java, and iPhone uses Safari script.

FIG. 26 provides the partial flowchart of cell-screen adaptation for MTP server. The image processing is handled at the server side to take advantage of server power, while compressing the image before screen delivery.

Step 2601, see if PC VM or cell VM. If PC VM, enter Step 2602. If cell VM, enter Step 2603;

Step 2602, screen may be the original PC screen, or adapted PC screen generated by the technology from applicant's China patent CN101231731A Proceed to Step 2610;

Step 2603, obtain the http head of cell phone request;

Step 2604, see if device database contains cell phone information. If yes, enter Step 2606. Otherwise, enter Step 2605;

Step 2605, report error and record in the server log file, to facilitate future updates for the device database. Currently there is no way to adapt the screen. 转入 Step 2610;

Step 2606, lookup and obtain cell phone screen height and width from server device database. Compare the screen image with actual cell phone height and width;

Step 2607, see if needed to rotate 90 degrees. If yes, enter Step 2608. Otherwise, enter Step 2609;

Step 2608, changeDisplaySetting(height, width) becomes changeDisplaySetting(width, height);

Step 2609, shrink or enlarge screen image proportionally;

Step 2610, deliver screen to cell phone client.

FIG. 27 provides the partial flowchart of intelligent screen delivery (server-side).

Step 2701, obtain screen image;

Step 2702, compare with the previous frame to detect the change portion of the image;

Step 2703, recognize text;

Step 2704, transmit text characters via data channel;

Step 2705, transmit regions of remaining changed images via image channel;

Step 2706, transmit the unchanged background if the first screen;

Step 2707, return.

FIG. 28 provides the partial flowchart of audio and GPS data handling (client-side). The audio logic for the server-side is similar to the client-side, hence not detailed here. Server only receives GPS data.

Step 2801, see if GPS or audio data. If GPS data, enter Step 2802. If audio data, enter Step 2803;

Step 2802, transmit GPS longitudinal and latitudinal data through data channel. Proceed to Step 2808;

Step 2803, negotiate audio standard with server (based on bandwidth on both ends and cell phone capabilities to select optimized audio codec.);

Step 2804, see if negotiation successful. If yes, use the negotiated standard and proceed to Step 2805. Otherwise use G.722 standard and proceed to Step 2805;

Step 2805, see if transmitting or receiving. If transmitting, enter Step 2806. If receiving, enter Step 2809;

Step 2806, use negotiated result standard to encode;

Step 2807, transmit coded voice through audio channel;

Step 2808, send out the data to server via multiple channels;

Step 2809, receive the data from voice channel;

Step 2810, use negotiated result standard to decode;

Step 2811, handle echo cancellation.

VDI Socket

Figure 29:
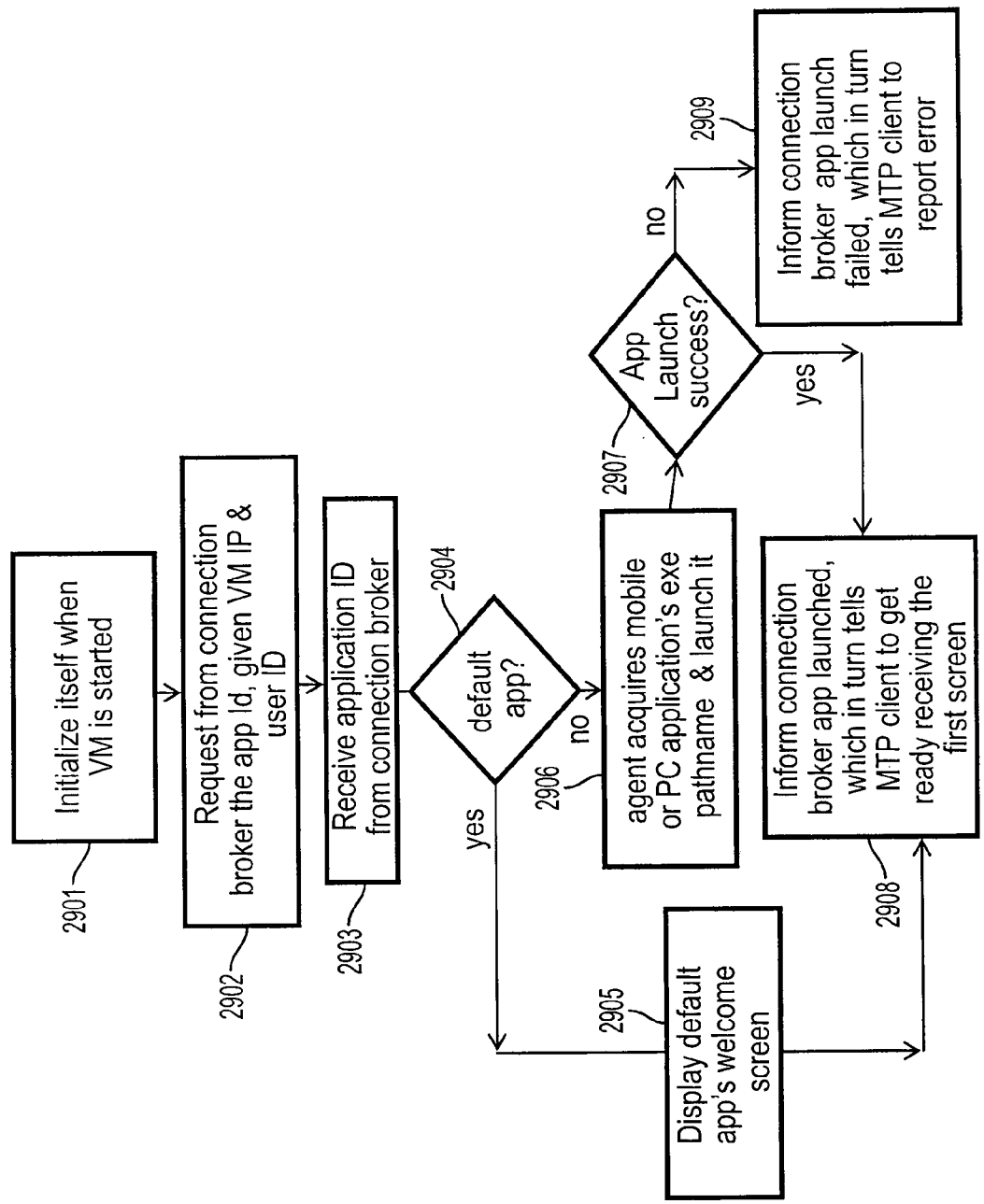
FIG. 29 is the flowchart of application agent 154 in FIG. 1B.

FIG. 29 provides the flowchart of application agent. Application agent is a program running on the guest OS to launch application. Similar to connection broker, application agent has two types: PC application agent 131 and cell application agent 157. The workflow is conceptually the same. However, PC application agent needs to run on various third-party VDI products, the requirements may be different. For example, PC application agent is able to work with Citrix XenApp, Microsoft App-V, and applicant's TranSOD product. PC application agent is one component of VDI socket, capable of virtualizing the PC application for cell phone user to "stream", via applicant's patent of patent publication number CN 101231731A, "A generalized application virtualization method for business use on the web, and the mini server using this method".

Step 2901, initialize itself when VM is started;

Step 2902, request from connection broker the app Id, given VM IP & user ID;

Step 2903, receive application ID from connection broker;

Step 2904, see if default application. If yes, enter Step 2905. Otherwise, enter Step 2906;

Step 2905, display default app's welcome screen;

Step 2906, agent acquires mobile or PC application's exe pathname & launch it;

Step 2907, see if application launch successful. If yes, enter Step 2908. Otherwise, enter Step 2909;

Step 2908, Inform connection broker app launched, which in turn tells MTP client to get ready receiving the first screen;

Step 2909, Inform connection broker app launch failed, which in turn tells MTP client to report error.

Figure 30:
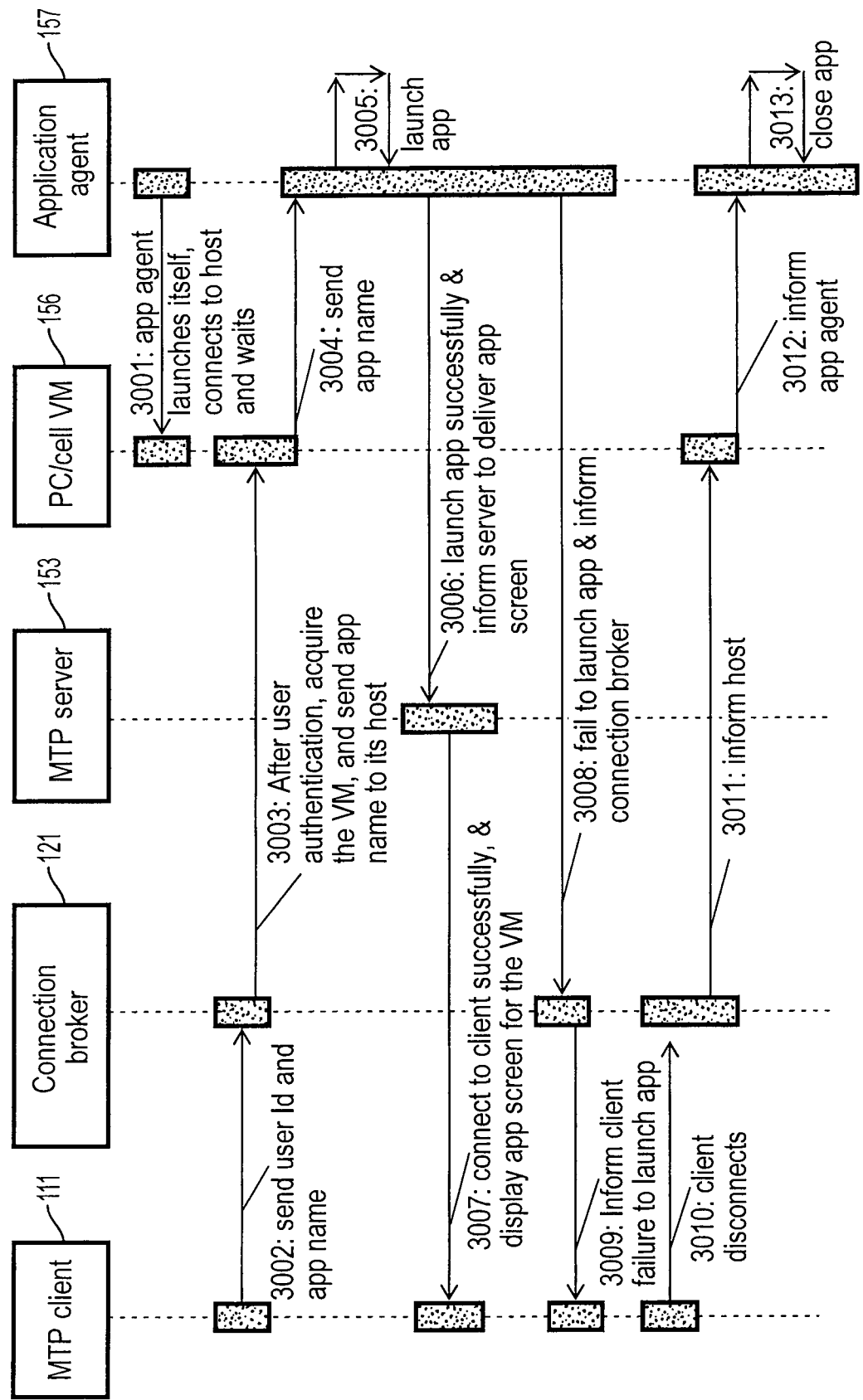
FIG. 30 is the sequence diagram of application launch and shutdown.

FIG. 30 provides the sequence diagram for application launch and shutdown. FIG. 30 explains for both PC applications and cell applications. For example, the connection broker can be regarded as PC connection broker or cell connection broker; Application agent can be regarded as PC application agent or cell application agent, etc. When regarded as cell application agent, the sequence diagram explains the timing sequence of the interactions among MTP client 111, cell connection broker 1212, MTP server 153 inside of QEMU, cell VM 156, and cell application agent 157:

Step 3001, the cell application agent 157, after activated and connected to the VM starting on the host, stay in a wait state;

Step 3002, MTP client 111 sends user id and application name to cell connection broker 1212;

Step 3003, cell connection broker 1212 after authenticated, acquire the VM, and proceed to send application name to the host;

Step 3004, VM's host sends the application name to the cell application agent 157;

Step 3005, cell application agent 157 launches the application. If successful, enter 3006. Otherwise, enter 3008;

Step 3006, application launch is successful. Inform MTP server 153 to deliver application screen;

Step 3007, MTP server 153 connects to MTP client 111 successfully, and display the screen of the application running on VM;

Step 3008, application launch fails. Inform cell connection broker 1212;

Step 3009, cell connection broker 1212 inform MTP client 111 that application launch fails;

Step 3010, client 111 disconnects. Inform cell connection broker 1212;

Step 3011, cell connection broker 1212 inform the host of the VM;

Step 3012, VM's host inform cell application agent;

Step 3013, cell application agent 157 shuts down the application.

In the real-world deploying environment, it is entirely possible to deploy the VM switch 12 and data management center 14 in a telco data center, or entirely in a enterprise. It is also possible to deploy the VM switch 12 in telco, while data management center 14 in enterprise. The I/O device debugging pre-processor related to this invention may be usable to any cell phone OS virtualization.

The illustration of the above flow charts and sequence diagram explain virtual mobile infrastructure (VMI). On one hand, VMI provides an application subscription method on the mobile network for the telco. The method is based on cell phone OS being virtualized, with the improved mobile terminal protocol, to allow user access, VM acquisition, application running, and screen delivery, thereby can be operated on any cell OS and cell application. On the other hand, because of the encapsulation of third-party VDI products, the method also allows a cell phone to run any PC OS and PC application.

As a summary, this invention combines cell phone on-board debugging technology, QEMU emulation technology, OS virtualization technology, and virtual desktop infrastructure technology. It provides a virtual mobile infrastructure for enterprises and telcos.

While this invention has been particularly shown and described with references to preferred embodiments thereof, it will be understood by those skilled in the art that various changes in form and details may be made therein without departing from the scope of the invention encompassed by the claims.

What is claimed is:

1. A method for building a virtual mobile infrastructure, comprising:
   connecting a base platform containing a plurality of hosts to a data management center,
   wherein each of the hosts runs a quick emulator (QEMU) process on top of a host operating system (OS), to virtualize at least one guest operating system and a memory, as a mobile virtual machine (VM), the VM runs one or more applications per requests from a user;
   wherein the data management center, managing the VMs generated by the base platform, and allocating the VMs to the user;
   connecting a VM switch to the base platform and the data management center, the VM switch responds to requests from the user and allows the user to select one or more of the VMs, and applications running on the VMs;
   connecting a mobile client to the VM switch, the mobile client running on a user's mobile device to send request to one or more of the VMs and the applications, the VMs of the hosts run the applications, the mobile device does not run the applications; and
   interacting a mobile terminal protocol (MTP) server based on a mobile terminal protocol with the mobile client to deliver one or more application screens corresponding to the applications to the user's mobile device.

2. The method of claim 1, further comprising sharing memory for the QEMU process and a guest OS kernel.

3. The method of claim 1, wherein a performance agent of the base platform acquires performance statistics of the host and/or child processes of the host.

4. The method of claim 1, further comprising improving a memory management unit (MMU) of the QEMU process, including using a page lookup to find a physical address of a virtual address of a guest OS memory region, and further taking the physical address as an offset to mask out an address in an assembly instruction.

5. The method of claim 1, further comprising determining whether a guest OS allows for debugging virtualized I/O device drivers and whether the guest OS allows a rebuild to improve the performance of the I/O device of the mobile device, if the guest OS allows for debugging the I/O device drivers or allows the rebuild, a preprocessor of the base platform debugs the virtualized I/O device drivers; if a platform building tool is acquired, the I/O device drivers are debugged with the tool; otherwise, a development hardware board and a board support package (BSP) are used to allow a reverse engineering work.

6. The method of claim 1, wherein the MTP server runs on the top of the host OS of the base platform.

7. The method of claim 1, wherein the MTP server adapts a screen proportionally to a mobile screen size by shrinking, expanding, rotating, and compressing a screen image before the screen image is sent to the mobile client; the MTP server detects an image change, recognizes a text, and delivers the text and a changed square region only, before the screen image is sent to the client.

8. The method of claim 1, wherein the mobile client delivers global positioning system (GPS) longitude and latitude data through a data channel to the MTP server, supports an echo cancelling, and negotiates an optimal method from multiple audio codecs, based on a wireless bandwidth and mobile hardware capability.

9. The method of claim 1, wherein a VM allocator of the data management center builds a session, acquire an optimal VM from a VM pool, and allocate the VM to the mobile clients; a VM pool manager, to select an optimal VM in the pool, return the VM to the pool, check VM states, and use a background worker to continuously check pool status in order to match the rules from a rule engine; a VM server manager, to manage multiple hosts and use a platform application programming interface (API) to interact with the base platform; and a management console, to unify the management of a composition of resources including: a human organization, a template, a virtual machine, an application, a package, and the platform server.

10. The method of claim 9, wherein the rule engine contains control rules to generate, destroy, start and stop the VMs, wherein the rules are created, edited, loaded, saved, and deleted by administrators with a high-level computer language.

11. The method of claim 1, wherein a connection broker of the VM switch provides access for the mobile client, and deliver an OS screen and an application screen to the mobile client.

12. The method of claim 1, wherein a connection broker of the VM switch is connected to the mobile client, the connection broker contains: a unified authentication and an authorization to complete a Kerberos security protocol and a single sign-on.

13. The method of claim 1, wherein the VM switch further contains: personnel and organization databases, application and package databases, and VM server and template management databases.

14. The method of claim 1, wherein the VM switch manages a template, the template is used to bind one or more of configuration items including: a VM, a memory, a CPU, an application, a host, and a mobile OS.

15. The method of claim 1, wherein the VM switch encapsulates a third-party virtual desktop infrastructure (VDI) product via a VDI socket, so that a user is able to select a personal computer (PC) VM and a PC application running on an external VDI product.

16. The method of claim 15, wherein a PC connection broker of the VDI socket informs the external VDI product that after user login, which application is run on the selected VM, and informs the mobile client to get ready to receive an application screen via the MTP after a PC application agent activates the application; the PC application agent, installed on the VM of the external VDI product before the VM starts; when the VM starts, the application agent itself is activated, and then activates the requested PC application; the application agent then informs the PC connection broker failure or success of the activation; if successful, the application screen is delivered to the mobile client; when mobile client disconnects, the PC application agent shuts down the application.

17. A virtual mobile base platform, including:
a plurality of hosts, each of the hosts including:
at least one quick emulator (QEMU) running on a host operating system (OS), to virtualize at least one guest OS, a process of the emulator and a kernel of the guest OS share a physical memory of the host;
a performance agent that acquires performance statistics of child processes and/or host itself; and
a mobile terminal protocol (MTP) server, to interact with a mobile client to deliver an application screen to a mobile device,
wherein the hosts receive request from the mobile client to run an application and generate the application screen according to the application, and the mobile device does not run the application.

18. The method of claim 17, wherein the virtual mobile base platform improves a QEMU soft memory management unit (MMU), wherein a page lookup is used to find a physical address of a virtual address of a guest OS memory region, and the physical address is taken as an offset to mask out an address in an assembly instruction.

19. The method of claim 17, further comprising determining whether a guest OS allows for debugging virtualized I/O device drivers and whether the guest OS allows a rebuild to improve the performance of the I/O device of the mobile device, if the guest OS allows for debugging the I/O device or allows the rebuild, a preprocessor of the base platform debugs the virtualized I/O device drivers; if a platform building tool is acquired, the I/O device drivers are debugged with the tool; otherwise, a development hardware board and a board support package (BSP) are used to allow a reverse engineering work.

20. A method for supplying a mobile application for a user using a mobile, the method comprising:
receiving a request from the mobile for running the mobile application;
determining whether the user subscribes the mobile application;
if the application is a PC application, informing a PC application agent to launch the PC application, if the application is not a PC application, informing a mobile application agent to launch the mobile application;
running one or more virtual machines on a host that is remote from the mobile, the virtual machine including a guest operating system that runs the mobile application agent and a memory, the guest operating system runs on a host operating system;
acquiring and allocating one of the virtual machine for the mobile application;
running the mobile application on the allocated virtual machine, the mobile application is not run on the mobile device;
generating an application screen according to the mobile application, adapting the application screen to the mobile; and
sending the adapted application screen to the mobile.

21. The method of claim 1, wherein the base platform including the hosts which is remote from the user's mobile device, runs the requested applications, generates the application screens, then delivers the application screens to the mobile device.

\* \* \* \* \*